United States Patent [19]
Stohs

[11] Patent Number: 4,837,994
[45] Date of Patent: * Jun. 13, 1989

[54] COMPOSITE METAL/CONCRETE FLOOR AND METHOD

[75] Inventor: Larry A. Stohs, Columbia, S.C.

[73] Assignee: Consolidated Systems, Inc., Columbia, S.C.

[*] Notice: The portion of the term of this patent subsequent to Feb. 23, 2005 has been disclaimed.

[21] Appl. No.: 790,240

[22] Filed: Oct. 22, 1985

Related U.S. Application Data

[63] Continuation-in-part of Ser. No. 626,721, Jul. 2, 1984, Pat. No. 4,726,159.

[51] Int. Cl.$^4$ .............. E04B 5/48; E04F 19/08; H02G 3/18; H02G 3/28
[52] U.S. Cl. .................................................. 52/221
[58] Field of Search .............. 52/220, 221, 126.2, 52/336; 174/48

[56] References Cited

U.S. PATENT DOCUMENTS

| | | | |
|---|---|---|---|
| 2,912,848 | 11/1959 | Lee et al. | 52/221 |
| 3,417,191 | 12/1968 | Fork | 52/221 X |
| 3,426,802 | 2/1969 | Fork | 52/221 |
| 3,453,791 | 7/1969 | Fork | 52/221 |
| 3,592,956 | 7/1971 | Fork | 52/221 X |
| 3,721,051 | 3/1973 | Fork | 52/221 X |
| 3,753,585 | 8/1973 | Casto | 52/221 X |
| 3,812,636 | 5/1974 | Albrecht et al. | 52/221 X |
| 3,886,702 | 6/1975 | Fork | 52/221 |
| 3,903,666 | 9/1975 | Fork | 52/221 |
| 3,932,696 | 1/1976 | Fork et al. | 52/221 X |
| 4,041,238 | 8/1977 | Penczak | 52/221 X |
| 4,178,469 | 12/1979 | Fork | 52/221 X |
| 4,194,332 | 3/1980 | Fork | 52/220 |
| 4,338,484 | 7/1982 | Littrell | 52/221 X |
| 4,453,364 | 6/1984 | Ting | 52/220 X |
| 4,554,771 | 11/1985 | Marwah et al. | 52/221 |
| 4,593,506 | 6/1986 | Hartman et al. | 52/221 |
| 4,630,414 | 12/1986 | Ting | 52/220 |

FOREIGN PATENT DOCUMENTS

| 3506 | 8/1979 | European Pat. Off. |
| 1176824 | 4/1959 | France . |

Primary Examiner—John E. Murtagh
Attorney, Agent, or Firm—Rogers & Killeen

[57] ABSTRACT

A composite metal/concrete floor system and method of installation. The system includes a novel decking profile; snap-in cover plates to provide longitudinal cells for three services; a lateral trench with sheet metal rails and bottom plates; and cooperating preset inserts. The deck and cover plate may be used as distribution cells suspended between the bar joists of a formed deck.

32 Claims, 16 Drawing Sheets

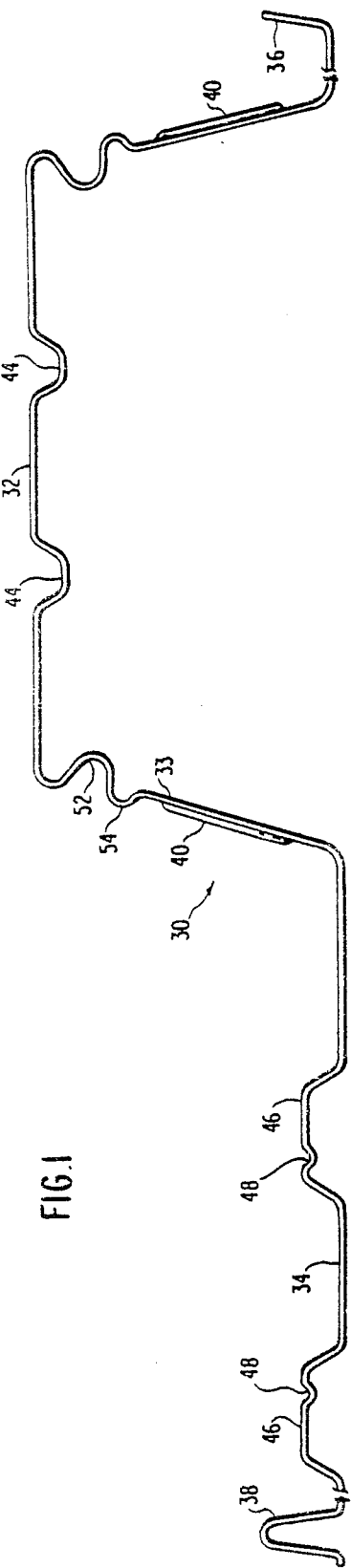
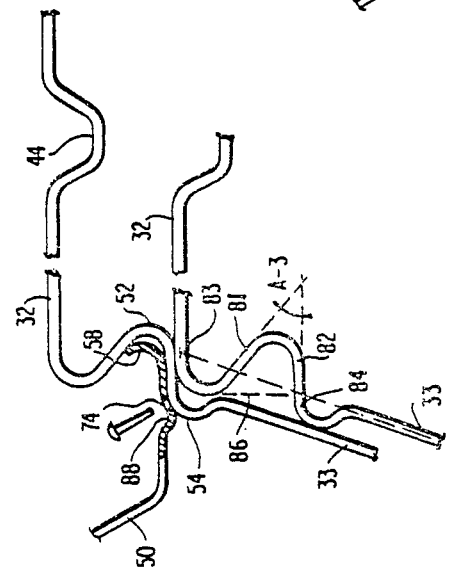
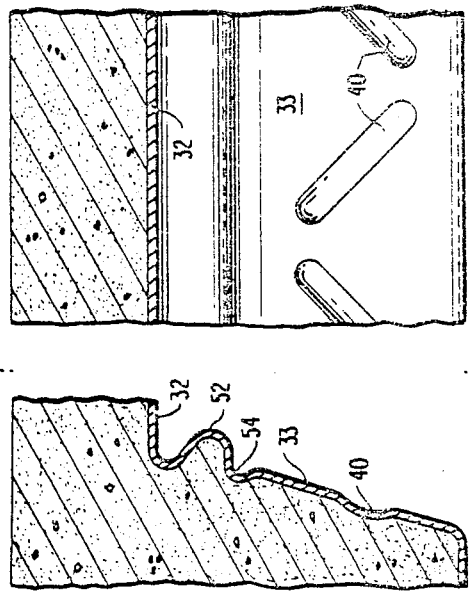
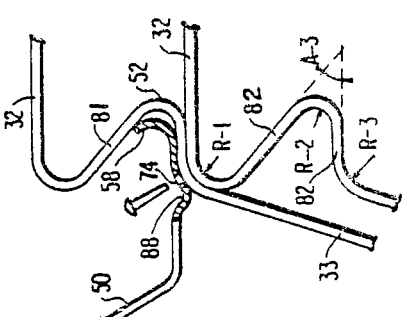
FIG. 1
FIG. 2
FIG. 3
FIG. 7
FIG. 8

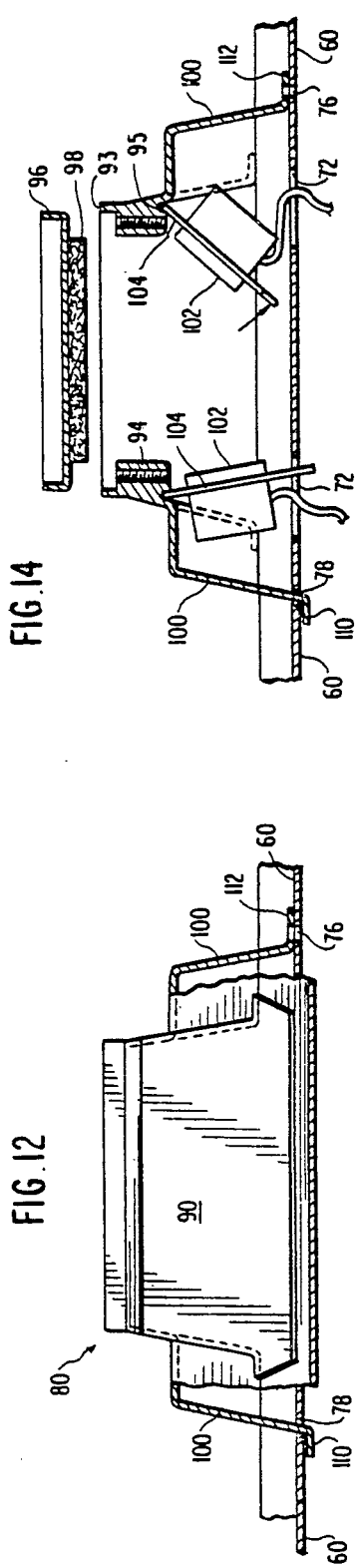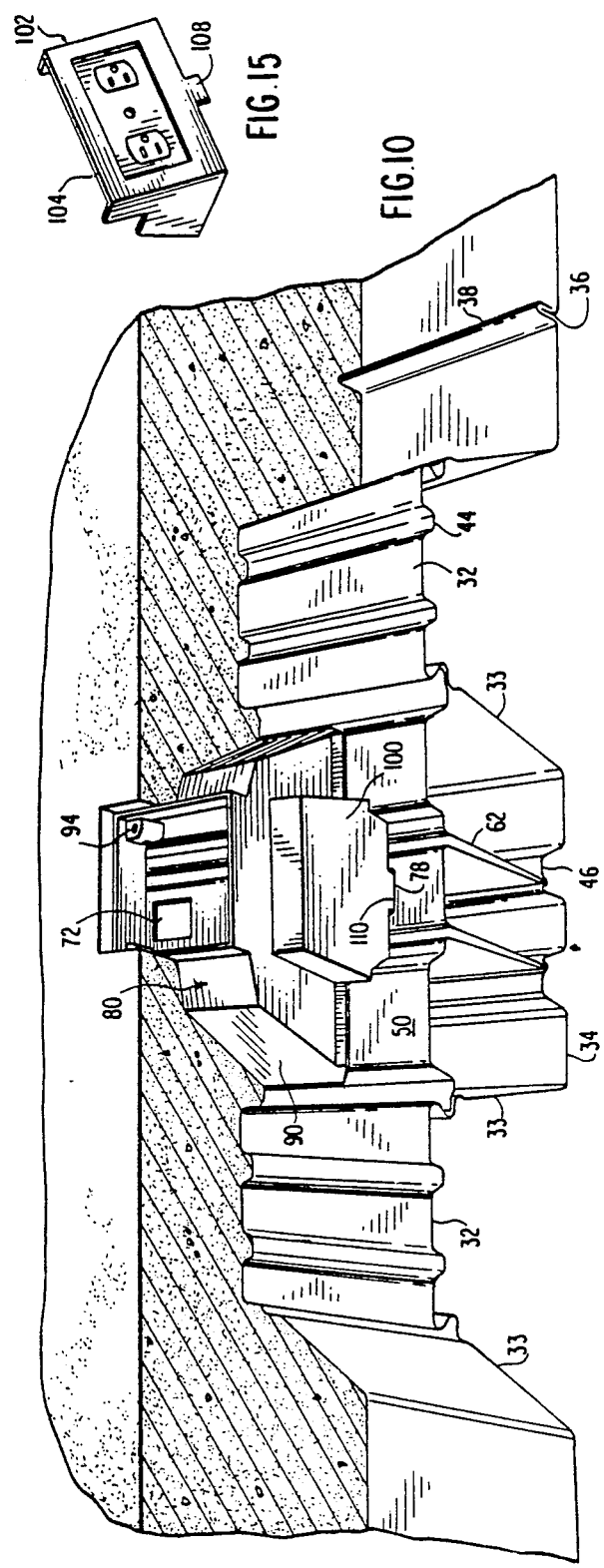

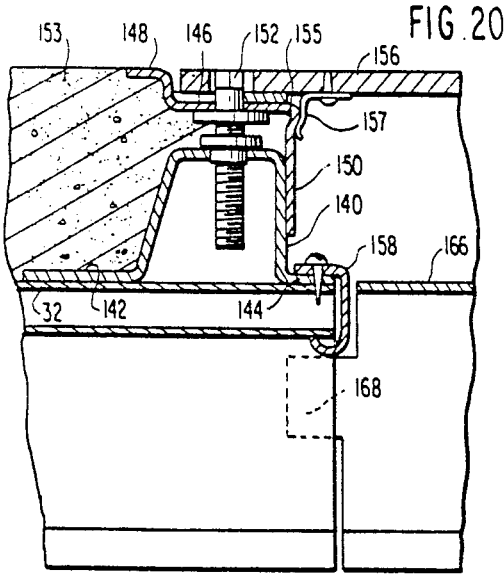
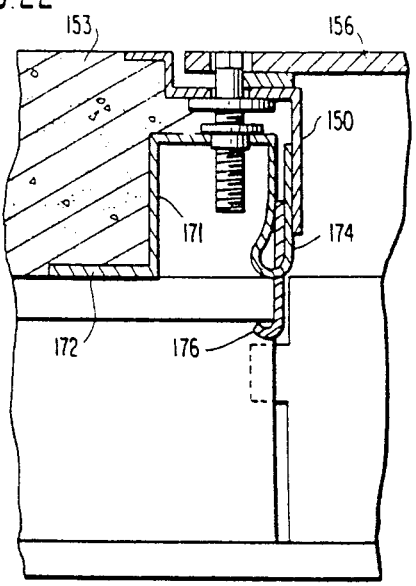
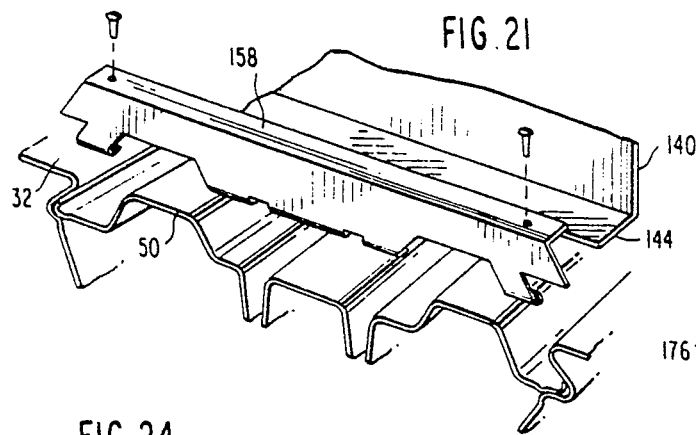
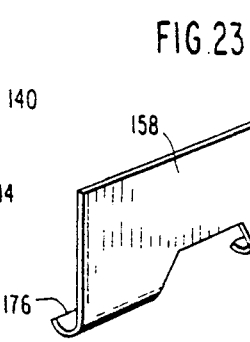
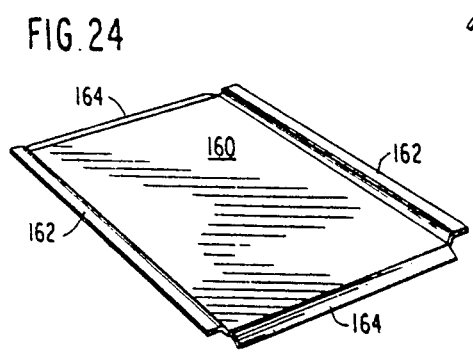
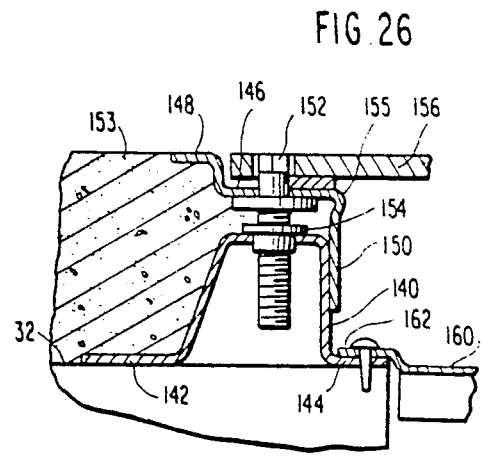
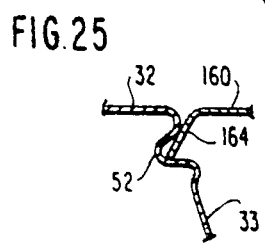

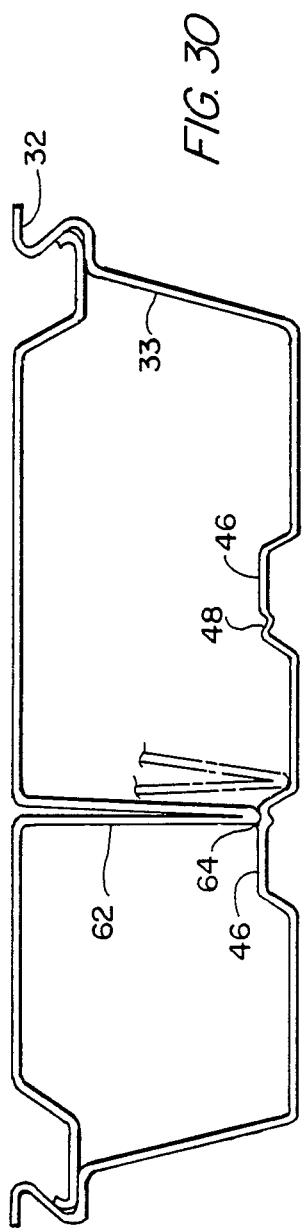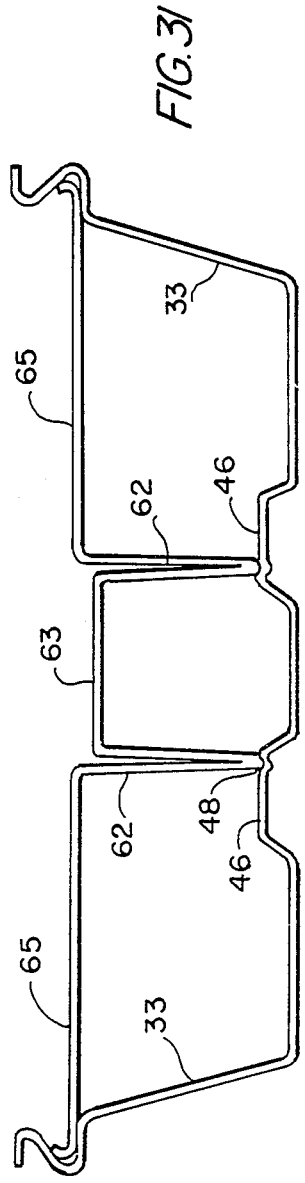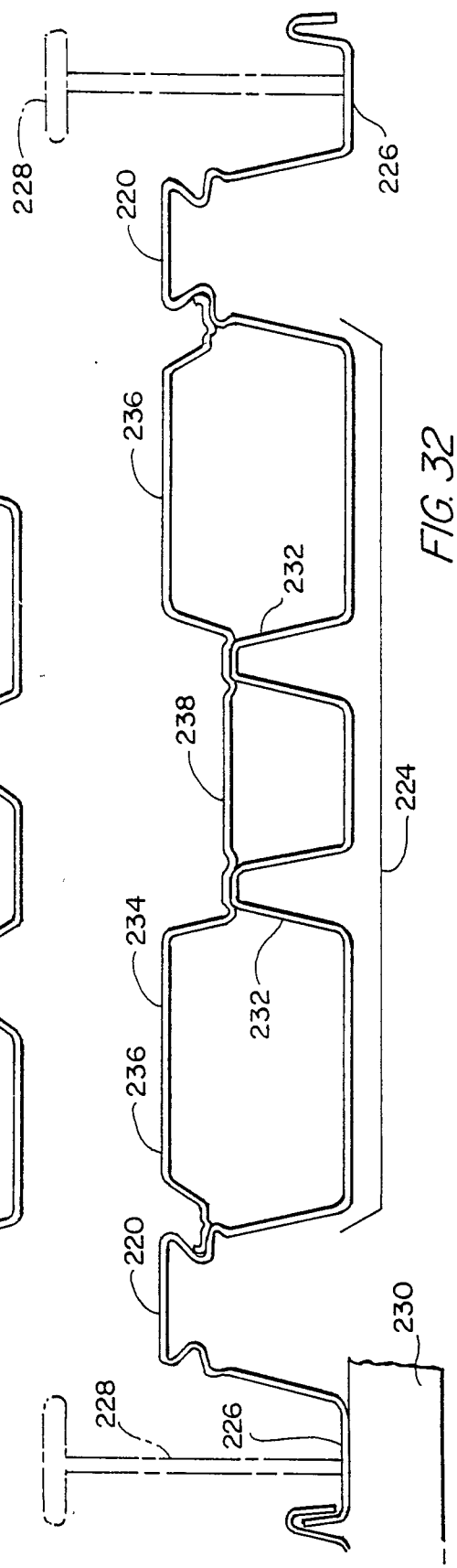

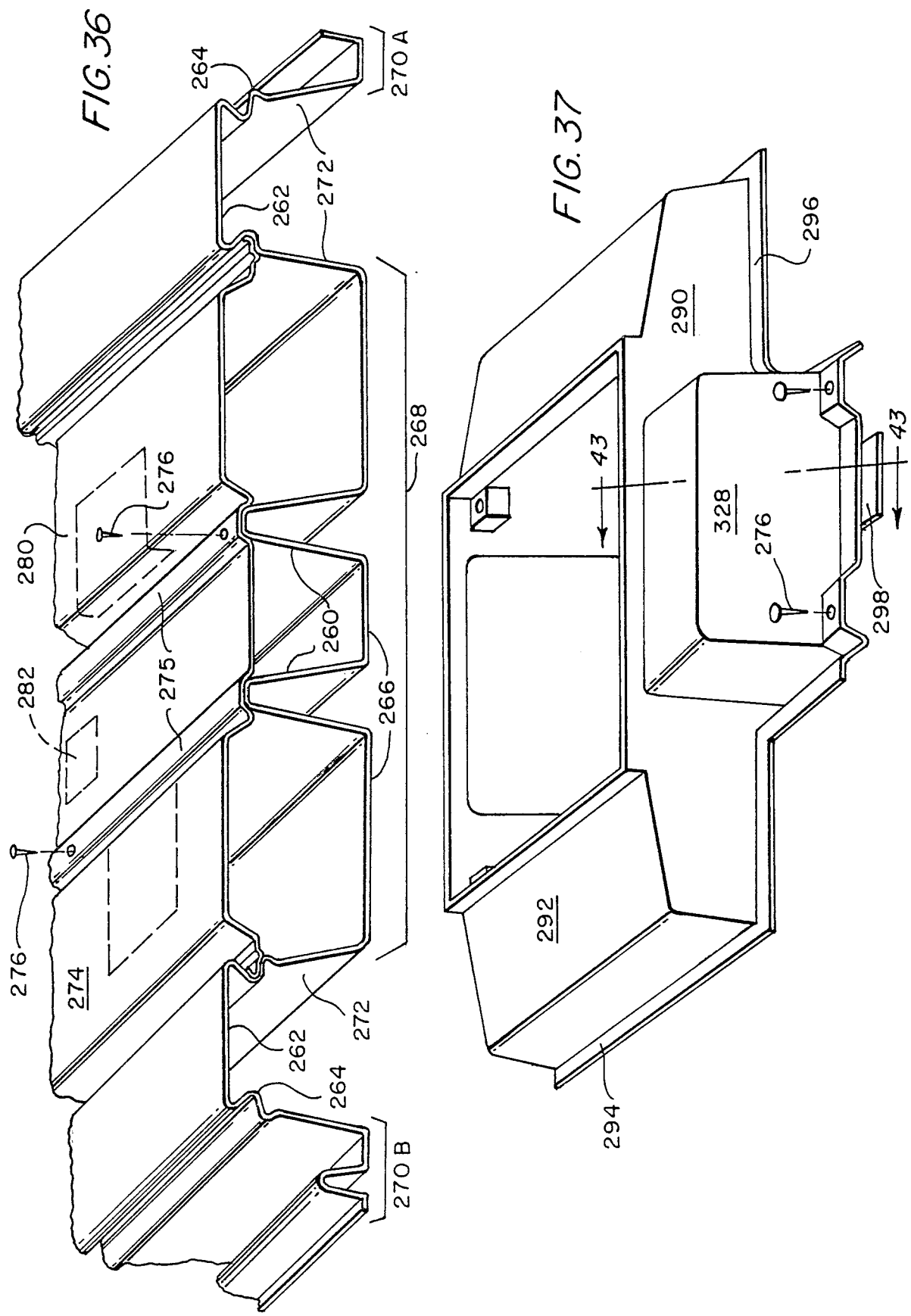

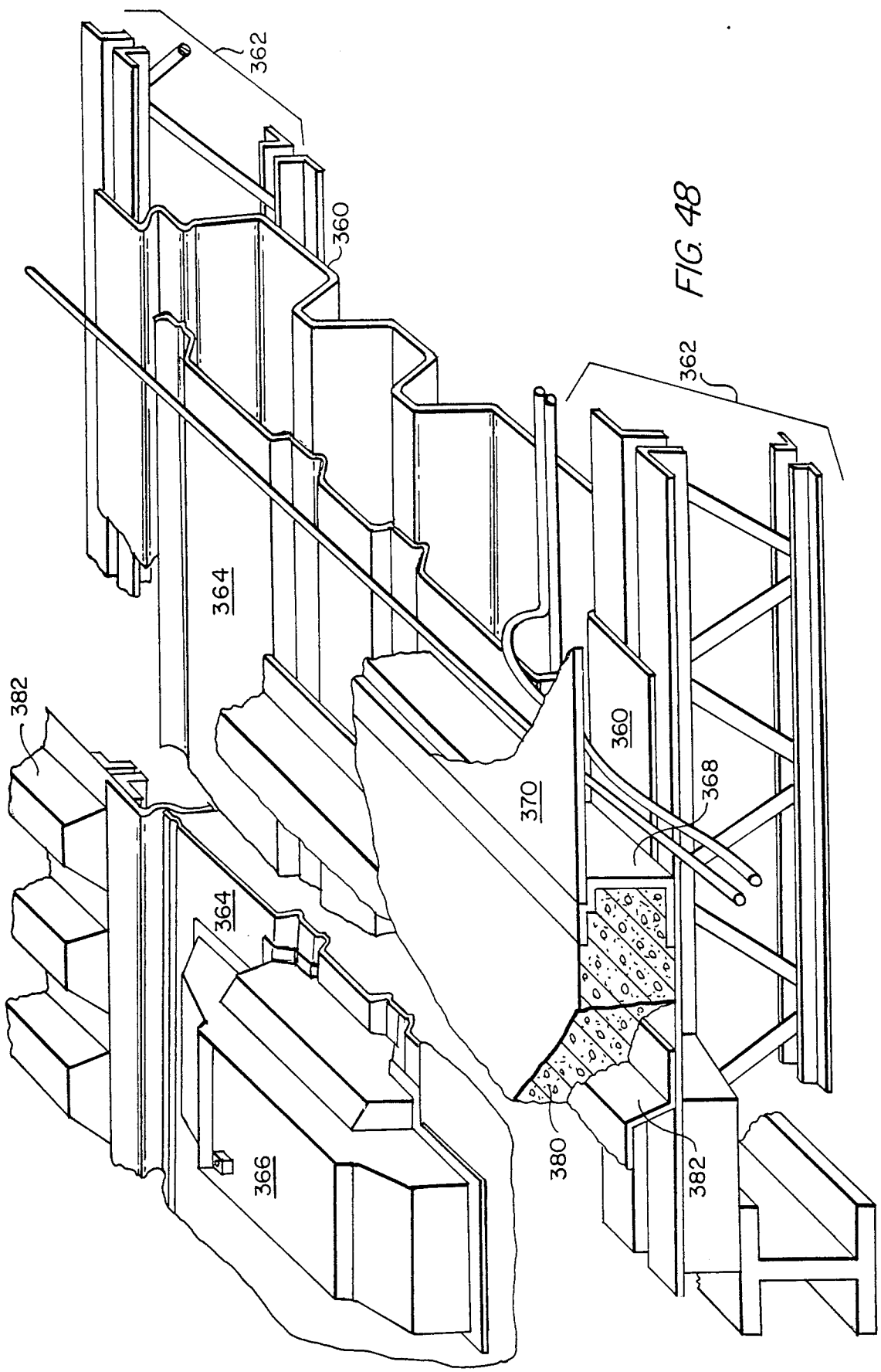

COMPOSITE METAL/CONCRETE FLOOR AND METHOD

RELATED APPLICATIONS

This is a continuation-in-part of application Ser. No. 626,721, filed July 2, 1984, now U.S. Pat. No. 4,726,159.

BACKGROUND OF THE INVENTION

The present invention relates to an improved electrified composite metal/concrete floor.

Such floors are well known and comprise a corrugated metal decking over which concrete is poured. Such floors are often electrified in that electrical power and telephone and other communication servides are distributed in the cells underlying the raised portions or crests of the decking, with access to the interior of the cells from the upper surface of the floor provided by inserts preset at selected intervals prior to the concrete pour. Access by the services to the interior of the longitudinal cells is generally provided by a lateral trench overlying the metal decking, which trench includes parallel rails covered with a metal plate coplanar with the upper surface of the concrete floor when poured.

In one aspect, the present invention includes a novel metal decking profile, with grooves adjacent the lateral edges of the crests to receive the concrete of the composite floor, stable when stacked during shipment to the job site.

Grooves adjacent the crests of decking to receive concrete are well known. For example, FIG. 4 of the French Patent No. 1,176,824 granted Nov. 28, 1958 to Wendel shows a decking profile in which the radii of the bend at the lateral edge of the crest and the bottom of the groove are equal and in which the centers for the bends are vertically spaced approximately twice such radii. Concrete enters the groove to enhance the metal/concrete interaction, i.e., "composite action", when the concrete is poured. Stacking is stabilized by making the radius bend of the lateral edge of the lower side of the groove slightly larger than such radii to mate with the lateral edge of an underlying decking member. However, the semi-cylindrical radius bends do not provide adequate deformation resistance to downward pressure from the lateral edges of the crests.

Grooves adjacent the lateral edge of metal decking are also shown in the Ting U.S. Pat. No. 4,453,364 dated June 12, 1984. In that patent, the grooves have a horizontal lower side and an upper side joining the radius bend of the lateral edge of the crest at an angle of approximately forty-five degrees. The Ting grooves are constructed such that (a) the lateral edge of the crest is at or inside of the plane of the sidewall and (b) a vertical line passing through the lateral edge of the crest intersects the sidewall structure at a point inside the plane of the sidewall, i.e., intersects a groove in the sidewall rather than the sidewall or any projection therefrom. While bending resistance is enhanced, the amount of concrete which can enter the groove is inadequate when cover plates are used. Moreover, the location of the lateral edge of the crests interiorly of the intersection of the planes of the sidewall and the crests results in instability in stacking.

The decking profiles of the present invention combine the stacking stability and metal/concrete interaction of Wendel with the improved strength of Ting, and further enhance the metal/concrete interaction. In one embodiment, this improvement is obtained by increasing the vertical separation of the centers of the radius bends of the crest and groove so as to join the groove and crest edge at an angle of approximately forty-five degrees. Stacking stability is enhanced by the matching of the radius bends of the side wall and crest. In another embodiment, the decking profile of the present invention further enhances composite action establishing a projection in the side wall immediately below the groove to thereby extend the horizontal lower wall of the groove. Stability when stacked is enhanced by the abutment of the projection with the side wall at a point on the side wall below the crest.

In other embodiments, the center of the projection is displaced outwardly so as to increase the shoulder on which cover plates may rest.

In another aspect, the decking profile of the present invention has a central valley significantly wider than the side-lap valleys and wider than the crests. Conventional decking sections such as disclosed in the Albrecht, et al. U.S. Pat. No. 3,812,636 dated May 28, 1987, and the aforesaid Ting patent have central and side lap valleys of approximately equal width.

A third embodiment of the decking profile of the present invention provides adequate space for the use of studs in securing the side-lap valleys to the structural beams, while greatly increasing the effective space in the central valley where the servides are provided. The structural properties of the sections are enhanced by upwardly projecting cell dividers as explained infra in more detail.

In a fourth embodiment, the cell dividers in the central valley decking profile are elevated to a height adjacent the height of the crests, further enhancing the structural properties of the decking member and permitting the use of lighter gauge metal. Raising the cell dividers also increases the capacity of the central cell.

The elevation of the cell dividers permits attachment of the preset inserts through the cover plate directly to the decking member, thereby providing an electrical ground and avoiding the necessity for a secure metal-to-metal attachment of the cover plate to the decking member along the lateral edges of the cover plate. The elevation of the cell dividers also permits the use of the same cover plate with decks of different length.

In another aspect, the present invention includes snap-in cover plates for selected valleys of the decking to form longitudinal cells for electrification of the floor. Longitudinal cells for this purpose are well known. They may be formed by welding of the decking to an underlying plate as disclosed by the Penczak U.S. Pat. No. 4,041,238 dated Aug. 9, 1977, the Fork U.S. Pat. Nos. 4,178,469 dated Dec. 11, 1979, or 3,426,802 dated Feb. 11, 1969; or the Littrell U.S. Pat. No. 4,338,484 dated July 6, 1982. They may also be formed by snap-in plates beneath the crests of the decking as disclosed in the Fork U.S. Pat. No. 4,194,332 dated Mar. 25, 1980, and the Albrecht, et al. U.S. Pat. No. 3,812,636 dated May 28, 1974. The decking, however, is structurally weakened by the apertures necessary for access to the cells.

Others have avoided the problem of decking penetration by providing cover plates for a valley to thereby create a longitudinal cell within the valley. Systems of this type are disclosed in the Fork European Patent No. 0003506, the Fork U.S. Pat. No. 3,592,956 dated July 13, 1971, or the Lee, et al. U.S. Pat. No. 2,912,848 dated Nov. 17, 1959.

However, such systems generally provide a smooth upper surface with reduced composite action, do not provide for separation of services within the cell, span the valley without intermediate support, are not resiliently compressible for snap-in and do not have upturned lateral edges for prevention of water seeppage during the concrete pour.

Other systems utilize grooves adjacent the crests for retention of the flat cover plates. While lowering the cover plate provides an upturned edge for prevention of water seepage, the reduced height of the cell is generally unacceptable because of the resultant reduced capacity for all services, and the capacity (i.e., cross-sectional area) determines the number of wires and hence the length that a cell can branch out from the feeder or trench header. The aforementioned Ting application also teaches support of the cover plates intermediate the crests by two interconnected but spaced apart legs which separate the valley into two equal volume cells. However, such cover plates rely on concrete between the legs for strength, and thus further reduce the volume or capacity of the two cells, i.e., the use of parallel legs spaced sufficiently apart for concrete to enter therebetween significantly reduces the capacity of the two cells.

The cover plates of the present invention are stackable for shipment to the job site and are easily installed from above the decking. As contrasted with decking which must span from beam to beam and is thus installed by steel workers, the cover plates may be of shorter length and installed by electricians walking on the deck, thus greatly reducing installation costs.

The cover plates may provide two unequal capacity cells, or three cells of the same or different capacity, in the same valley. In one embodiment, they may be made of sheet metal and provided with one or two double walled legs to provide support intermediate the crests. The legs may be shaped and/or otherwise constructed to enhance lateral resiliency and thus secure a positive snap-lock engagement with the grooves. Metal/concrete interaction is retained and additional space for three services is provided by the selective raising of a portion of the cover plate above the point of connection thereof to the sidewalls, even to the same height as the crests, and by the substantial elimination of concrete between the walls of the legs. The decking profile permits the entry of significant concrete into the grooves with the lateral edges of the cover plate engaged therein, and even with the lateral edges of the preset inserts engaged therein as described infra. In three cell embodiments, the center section may be lowered to facilitate access to the two side cells. This lowering of the center cell provides adequate space for the nearly vertical mounting of electrical receptacles and increases the volume and thus the capacity of the preset inserts to house related accessories.

In still another aspect, the present invention includes a preset insert uniquely cooperating with the cover plates for access to the cells defined by the valley of the decking member and the cover plate. Known preset inserts such as disclosed in the Fork U.S. Pat. No. 3,932,696 dated Jan. 13, 1976 and Penczak U.S. Pat. No. 4,041,238 dated Aug. 9, 1977 span adjacent crests and are designed to provide access to cells beneath the crests. Others, such as Fork U.S. Pat. No. 3,417,191 dated Dec. 12, 1968, fit between the crests to provide access to cells beneath the crests, and still others, such as Fork U.S. Pat. No. 3,592,956 dated July 13, 1971, span two crests to provide access to cells beneath adjacent crests as well as a cell in the intervening valley. All require penetration of the decking.

In various embodiments, the preset inserts of the present invention are nestable to facilitate safe shipment to the job site, may be constructed of sheet metal, provide ready access to all three longitudinal cells, and cooperate with snap-in electrical power receptacles.

In the present invention, preset inserts may be carried solely by the cover plates, or by the decking, or by both. They may cooperate in snap-lock fashion with the grooves in the sidewall of the decking along the cover plate without significant diminution of the capacity of the cell, or may be snapped into apertures in the cover plate. In one embodiment, they may be secured directly to the cover plate and/or the cover plate and decking by threaded fasteners without penetration of such fasteners into the cells.

In yet another aspect, the present invention includes a novel lateral trench for distribution of the services to the longitudinal cells. Prior art trenches, such as disclosed in the Fork U.S. Pat. No. 3,886,702 dated June 3, 1975, generally extrude vertically adjustable side rails of aluminum. Many of the above, such as Fork, et al. U.S. Pat. No. 3,932,696 dated Jan. 13, 1976 and Penczak U.S. Pat. No. 4,056,896 dated Jan. 3, 1978, utilize the decking as the floor of the trench. Such trenches are often referred to as "bottomless". However, the use of the valley floor as the bottom of the trench requires tha the concrete be interrupted by depending dams or stops in the valleys beneath the rails to prevent filling of the trench with concrete flowing upwardly from the valleys underlying the trench. The use of vertical concrets stops which depend into the intervening valleys interrupts the concrete beneath the trench and thus effects a significant loss of strength of the completed floor.

The present invention in various embodiments provides rails of sheet metal of greatly reduced cost, and snap-in bottoms for the trench intermediate the electrified cells. Such bottoms may be supported by the crests, spanning at least two of them and the included valley, and engaging the grooves in the sidewall on the outside of the decking sections. Concrete may thus flow uninterrupted through the non-electrified valley beneath the trench, significantly enhancing the strength of the composite deck.

In other embodiments, the trench bottom plates have upturned lateral edges to position the trench side rails and a pair of spaced ridges to position the power channel within the trench.

In a further aspect, the decking members, cover plates and preset inserts of the present invention may be used to electrify a formed deck supported by bar joists. Such decks are generally electrified by the suspension of a header duct between selected pairs of bar joists and by distribution ducts overlying the corrugated deck which serves as the form for the concrete slab. Ducts of this type are generally factory welded and non-nestable. More importantly the capacity of the distribution duct and the preset inserts is limited by the depth of the concrete slab. The present invention permits reversal of the position of header and distribution ducts and thus provides significantly increased capacity for the electrical services with a reduced slab thickness.

These and the many other aspects and advantages of the present invention may more readily be understood from the claims and from the following detailed description when read in conjunction with the appended drawings.

THE DRAWINGS

FIG. 1 is an end view in elevation of one embodiment of a decking member of the present invention;

FIG. 2 is a section in elevation of the decking member of FIG. 1 with concrete poured thereon illustrating the concrete decking member interface;

FIG. 3 is a partial section in elevation taken through lines 3—3 of FIG. 2;

FIG. 7 is a partial end view in elevation illustrating the attachment of the cover plate of FIGS. 5 and 6 to the decking member of FIG. 1, and illustrating the nestability of the decking members of FIG. 1;

FIG. 8 is a partial end view in elevation illustrating the attachment of the cover plate of FIGS. 5 and 6 to a second embodiment of the decking members of the present invention, and illustrating the nestability of the decking members;

FIG. 10 is a pictorial view in a partial section illustrating the composite floor of the present invention with a preset insert in place over an electrified valley;

FIG. 12 is a section in elevation taken through lines 12—12 of FIG. 11;

FIG. 14 is a section in elevation taken through lines 14—14 of FIG. 11, illustrating the mounting of the electrical receptacles;

FIG. 15 is a pictorial representation of the electrical receptacle of FIG. 14;

FIG. 20 is a partial section in elevation taken through the center of an electrified valley at the junction of the distribution trench and illustrating one embodiment of trench construction of the present invention;

FIG. 21 is a pictorial representation illustrating the configuration and mounting of the decking member end partition of FIG. 20;

FIG. 22 is a partial section in elevation taken through the center of an electrified valley at the junction with the trench and illustrating a second embodiment of the trench of the present invention;

FIG. 23 is a pictorial view of the decking member end partition of the embodiment of FIG. 22;

FIG. 24 is a pictorial view of a second embodiment of the trench bottom plates of FIG. 4 in which the bottom plate spans several valleys;

FIG. 25 is a partial section in elevation illustrating the end construction of the bottom plates of FIG. 24 and the mounting thereof with the decking member of FIGS. 7 or 8;

FIG. 26 is a partial section in elevation illustrating the lateral construction and mounting of the bottom plates of FIG. 24 with the trench illustrated in FIG. 20.

FIG. 30 is an end view in elevation of the decking section of FIG. 1 with a third embodiment of the cover plate of the present invention in place thereon;

FIG. 31 is an end view in elevation of the decking section of FIG. 1 with a fourth embodiment of the cover plate of the present invention in place thereon;

FIG. 32 is an end view in elevation of a second embodiment of a decking member of the present invention with a fifth embodiment of a cover plate in place thereon;

As may also be seen from FIG. 8, the outer edge of the crest is outside the intersection 83 of the planes of the sidewall 33 and crest 32 and a vertical line 86 through the lateral edge of the crest will intersect the sidewall structure at or outside the plane of the sidewall 33.

Figure 33:
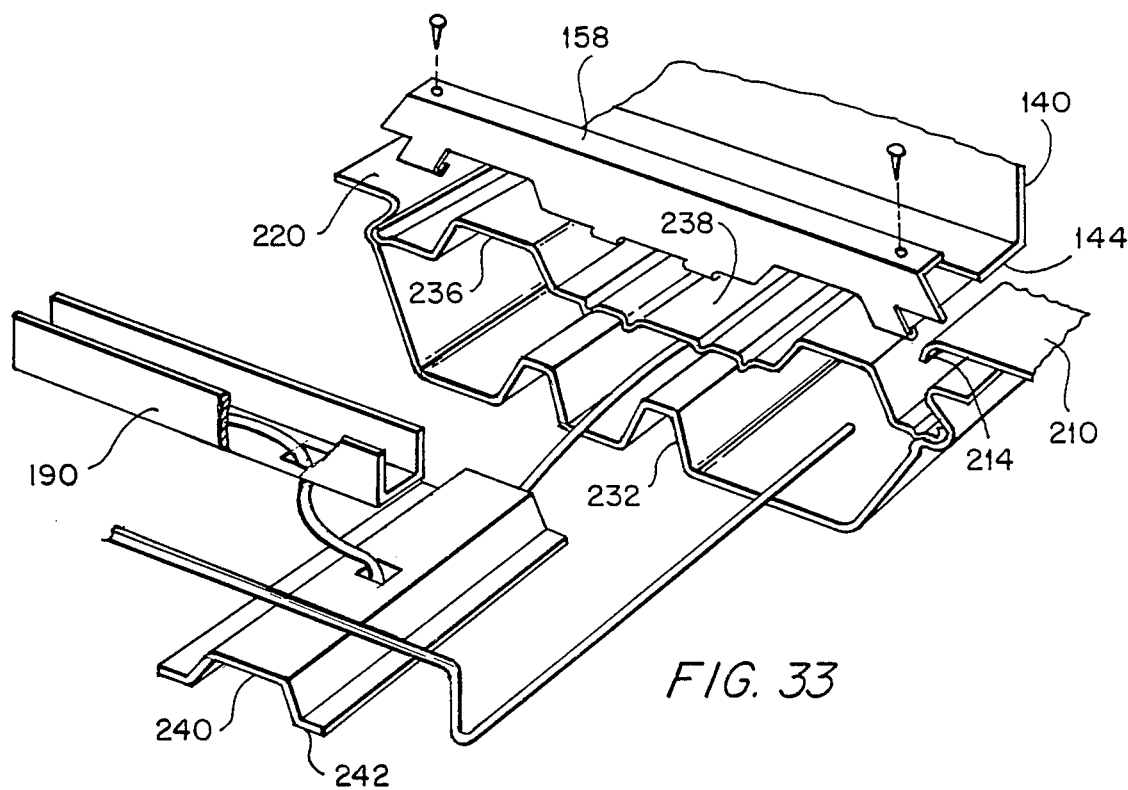
Figure 35:
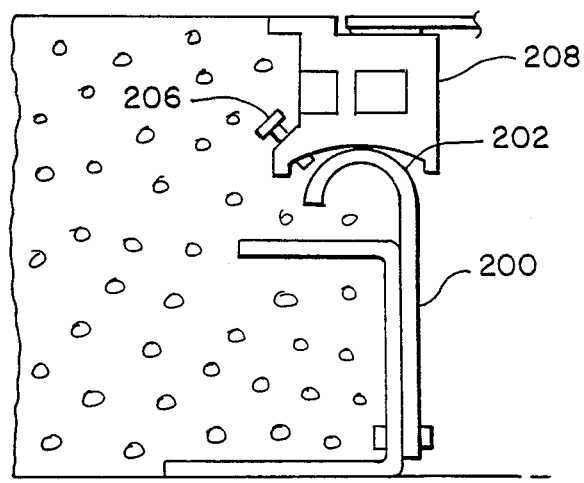
Figure 34A:
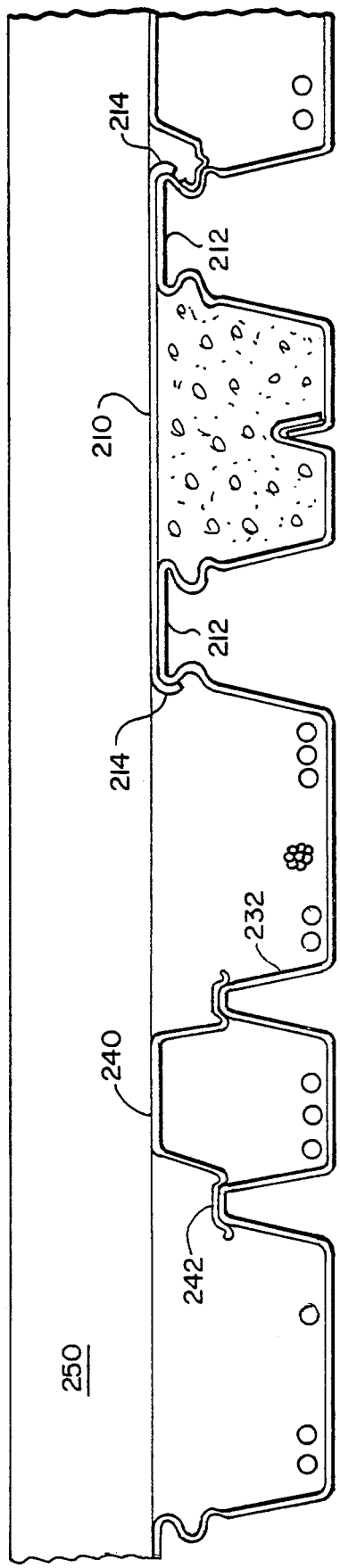
Figure 34B:
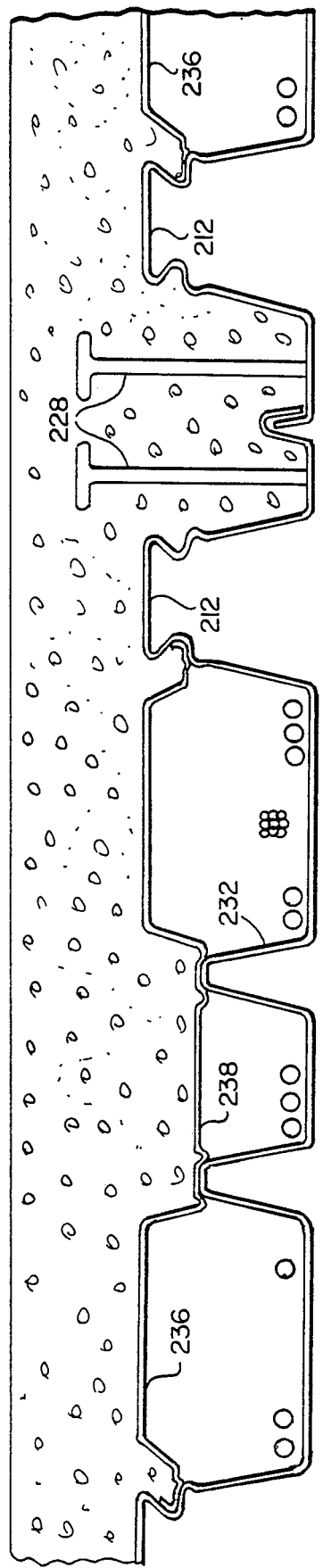
Figure 38:
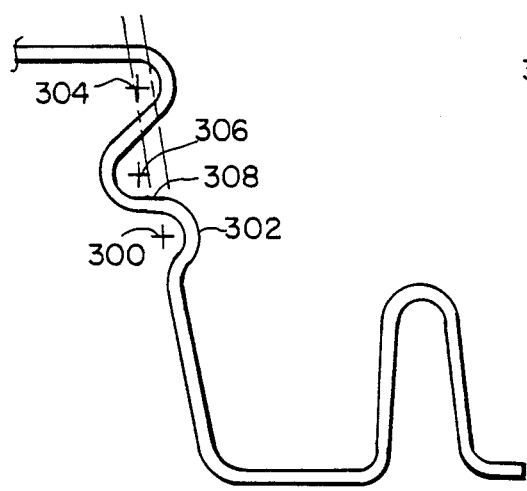
Figure 41:
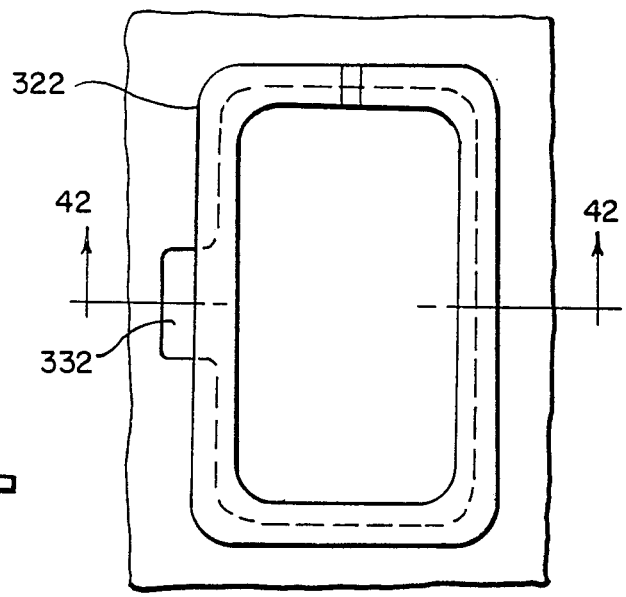
Figure 42:
Figure 43:
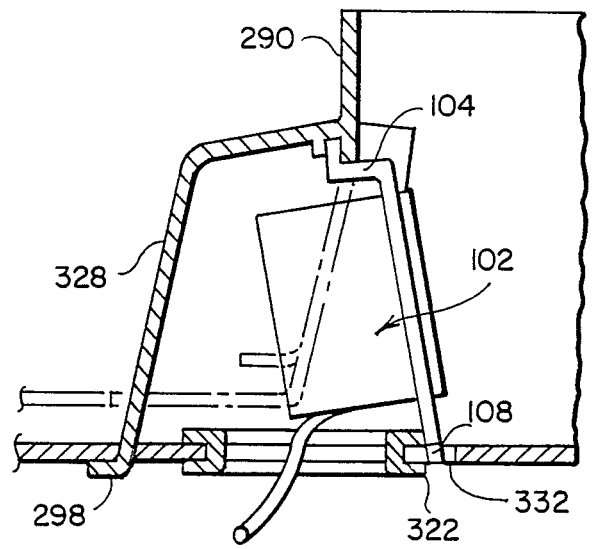
Figure 39:
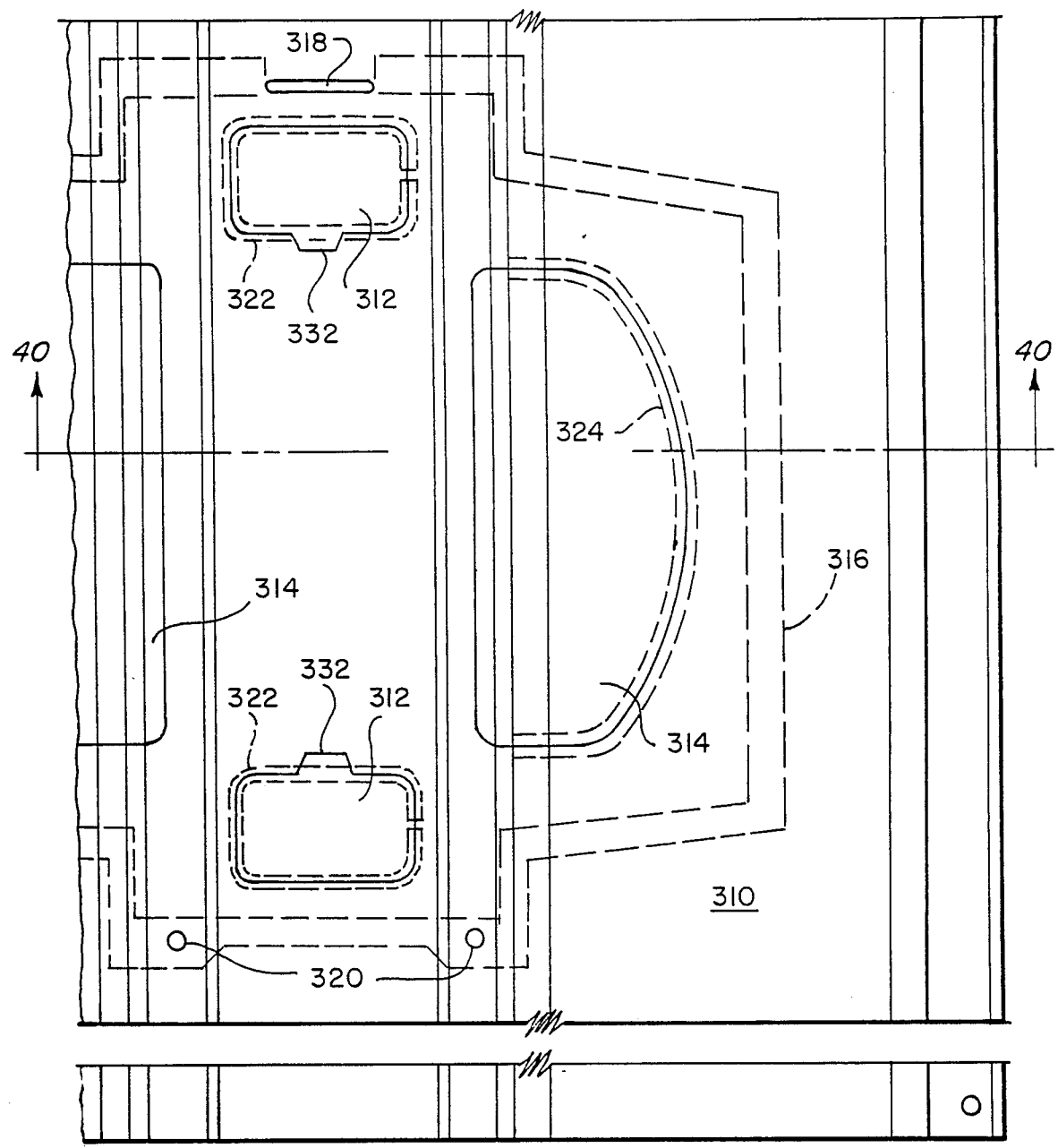
Figure 40:
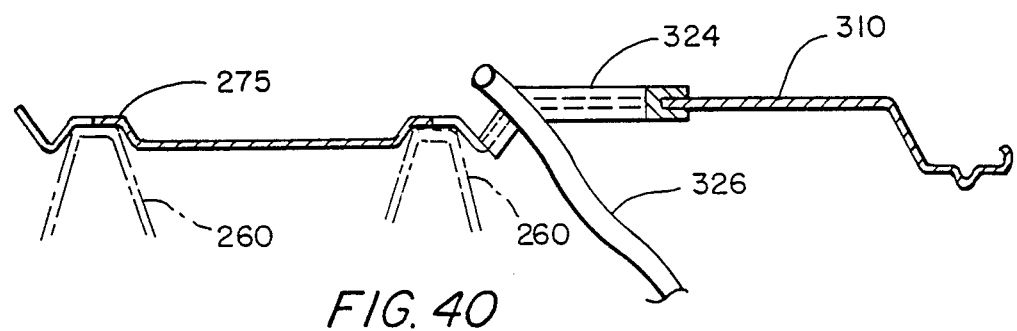
Figure 44:
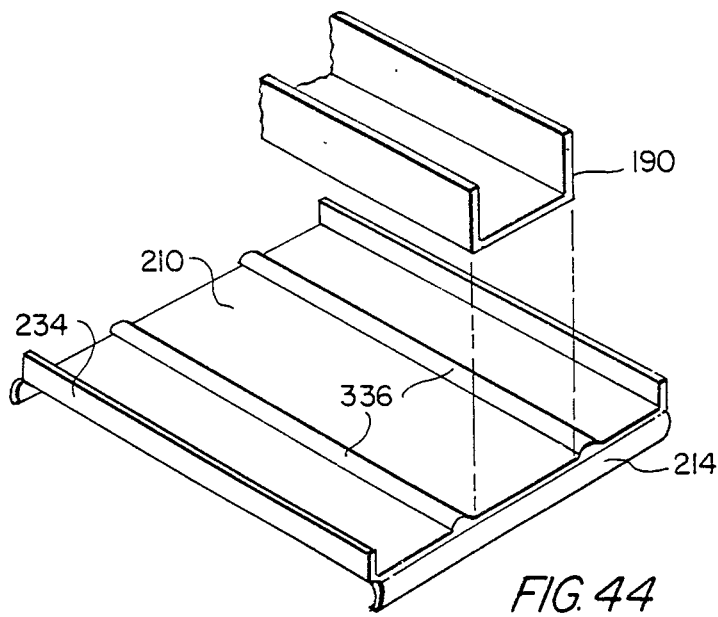
Figure 45:
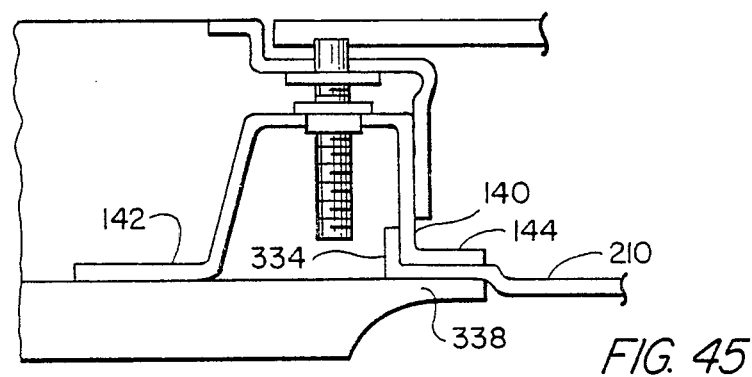
Figure 46:
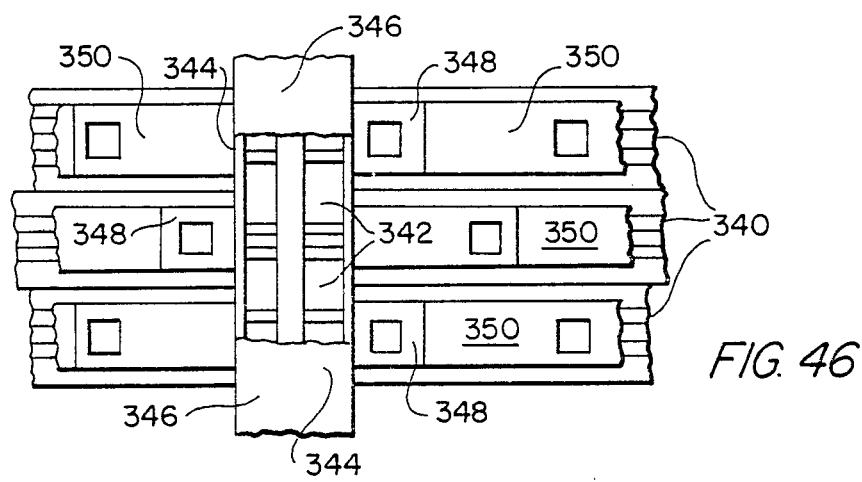
Figure 47:
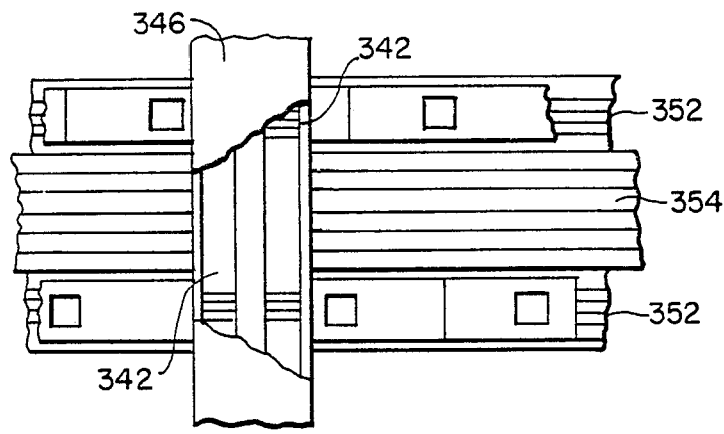

FIG. 33 is an exploded pictorial view of a second embodiment of the trench of the present invention;

FIG. 34A is an elevation in cross-section of the portion of the decking member of FIG. 33 after the concrete pour intermediate the rails of the trench with the power cell divider and trench bottom in place thereon;

FIG. 34B is an elevation in cross-section of the position of the decking member of FIG. 33 after the concrete pour outside the trench;

FIG. 35 is an elevation in cross-section of a third embodiment of a trench side rail;

FIG. 36 is a pictorial view of a fourth embodiment of the decking member of the present invention with a cover plate in place thereon;

FIG. 37 is a pictorial view of a further embodiment of a preset insert configured for attachment to the decking member and cover plate of FIG. 36;

FIG. 38 is a partial end view in elevation of a further embodiment of the decking member of the present invention;

FIG. 39 is a partial top plan view of a fifth embodiment of the cover plate of the present invention;

FIG. 40 is a section in elevation taken through lines 40—40 of FIG. 39;

FIG. 41 is a top plan view of a portion of the cover plate of FIG. 39 with the knock-outs of the central cell removed;

FIG. 42 is a section in elevation taken through lines 42—42 of FIG. 41;

FIG. 43 is a section in elevation taken through lines 43—43 of FIG. 37 showing the snap-in mounting of the electrical receptacles;

FIG. 44 is an exploded pictorial view of a further embodiment of the trench bottom plate as power cell;

FIG. 45 is an elevation of a further embodiment of the trench rail with the trench bottom plate of FIG. 44;

FIG. 46 is a top plan view of the decking system illustrating the use of short sections of cover plate to establish a pattern of offset rows of preset inserts;

FIG. 47 is a top plan view of the decking system illustrating the use of short sections of cover plate to establish a pattern of preset inserts with blended deck.

Figure 49:
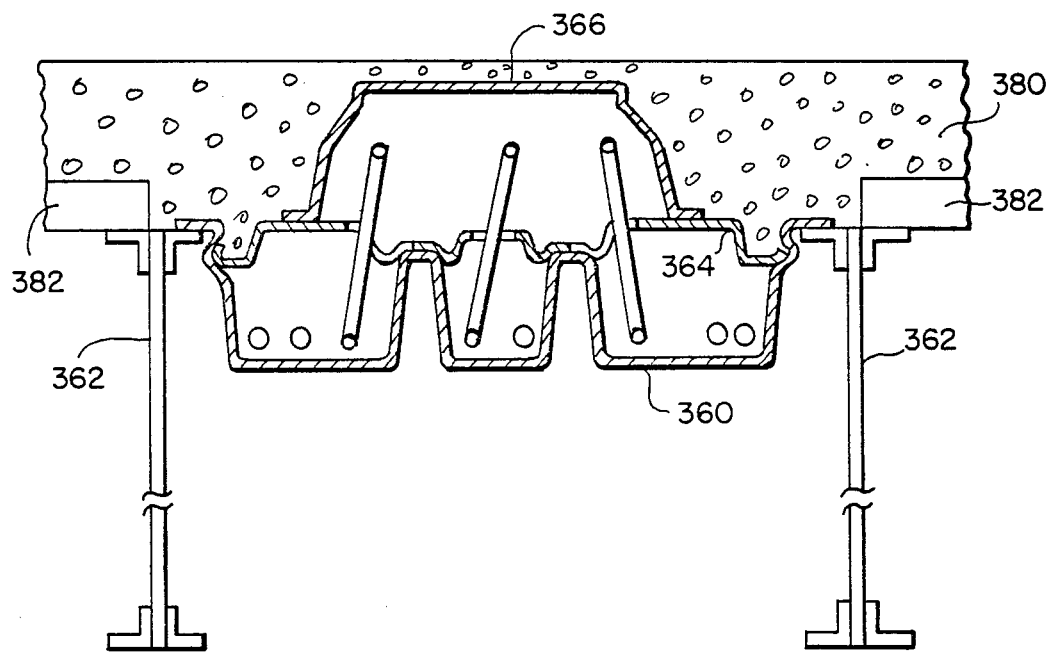

FIG. 48 is a pictorial view in partial section of a further embodiment of the present invention adapted for use with bar joist construction; and FIG. 49 is a schematic end view in elevation of the floor of FIG. 48.

THE DETAILED DESCRIPTION

The Decking Members

With reference now to the drawings, one embodiment of the decking member of the present invention is illustrated in FIGS. 1-3. As shown therein, the decking member indicated generally by the numeral 30 includes alternating crests 32 and valleys 34. As shown in the system drawing of FIG. 4, the decking members may each include two crests 32, a central valley 34A and with the lateral edges of the decking member 30 forming one-half of a side-lap valley 34B. The side-lap valley includes mating means such as an upturned edge 36 on one lateral edge and a downturned groove 38 on the other lateral edge. Of course, each decking member may include additional crests and valleys. However, it is desirable to avoid potential damage to electrical wiring from the rough lateral edges of the decking member and the crest-to-crest spacing of the side-lap valleys is not adequately reproducible to insure proper operation of the snap-lock of the cover plate therebetween. Therefore, only interior and complete valleys of a decking member will be electrified.

As shown in FIGS. 1-4, the crests 32 and valleys 34 are substantially coplanar and are interconnected by slanting sidewalls 33. The sidewalls 33 may be provided with a series of embossments 40 extending into or protruding from the sidewall to provide additional surface area and corrugations for contact with the concrete thereafter poured thereon, as shown in FIGS. 2 and 3.

As shown in FIG. 1, each of the crests 32 may be provided with one or more, preferably two, spaced stiffening beads 44 which enhance not only the structural strength of the crest but also the bending of the decking member to the concrete when poured thereon.

As shown in FIG. 1, each of the valleys 34 may also be provided with two longitudinal stiffening beads or projections 46 extending upwardly from the floor of the valley. In addition and to increase structural strength for the decking member 30, the projections 46 may include a groove 48 or other configuration for mating with the downward extending legs 64 of the cover plates of 50 shown in FIGS. 4-6 placed end to end over one of the valleys selected for electrification. The groove 48 provides increased stability until the concrete has been poured, in that it resists rotation of the cover plates when subjected to the load of construction traffic, etc. on the bends defining the lateral edges of the surface 56.

Figure 5:
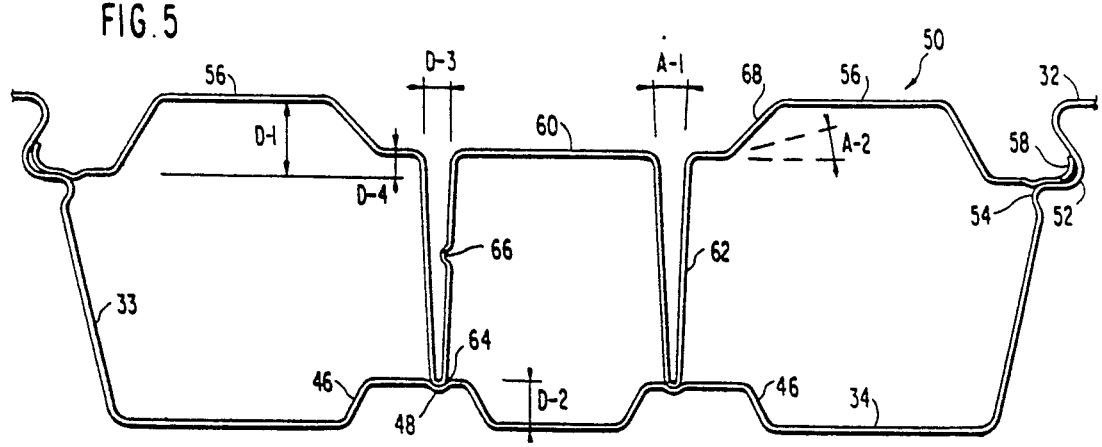
FIG. 5 is a section in elevation illustrating one embodiment of the cover plate of the present invention in place over one of the valleys of the decking member of FIG. 1 to form a three electrical service cell.

As shown in FIGS. 1, 2 and in the section of FIG. 5, the sidewall 33 of the decking member 30 includes an upper portion having a groove 52 and a projection 54 immediately adjacent the groove 52. The sidewall 33 also includes a substantially longer planar lower portion so that both the groove and projection are in the upper portion of the sidewall adjacent the crest.

While not shown to scale in FIG. 1, a typical decking member may be about 2 inches deep, 30 inches wide and in 20 to 40 foot lengths independent of the length of the cover plates used thereon to create the longitudinal cells. The width of the crests is generally less than the valleys in a ratio of about 4:5. Moreover, the central valley may be wider than the side-lap valley by ten percent or more (about twenty-five percent as shown in FIG. 10) and desirably in a ratio of about 5:14 as shown in FIG. 32. This increased central valley width is significant in both two and three cell embodiments, for it defines the total available capacity for the PLEC (power, lighting, electronic and communication) servides contained therein.

With reference to FIG. 7 where the decking member of FIG. 1 is illustrated in greater detail, it may be seen that the groove 52 in the upper portion of the sidewall includes an upper leg 81 and a lower leg 82. The upper leg is disposed at an angle A-3 of between about forty and about fifty degrees to the horizontal and the lower leg 82 is substantially horizontal and fairs smoothly into the horizontal portion 84 of the projection 54. It may thus be seen that a vertical line 86 dropped from the widest portion of the crests 32 intersects the upper surface 84 of the projection 54 rather than the lower leg 82 of the groove 52, i.e., it intersects the sidewall structure on or outside the plane of the sidewall 33. It may also be seen that the outermost projection of the crest is laterally outside of the intersection 83 of the planes of the crest 32 and the sidewall 33, thus providing a greater concrete holddown.

With continued reference to FIG. 7, the projection 54 on the sidewall 33 of the decking member provides increased stability for the lateral edge of the cover plate where a groove 88 is rolled into the lateral edge of the cover plate 50. As illustrated in FIGS. 7 and 8, the radii of the groove 88 and projection 54 may cooperate to increase stability. The location of the aperture 74 in the bend disposed the aperture at an angle to the vertical which insures that a fastener placed therein will penetrate the sidewall of the decking member and thus avoid the danger of diversion into the electrified valley.

As may also be seen in FIG. 7, the decking member 30 of FIG. 1 may be stacked for shipment with the underside of the groove 52 supported by the crest 32 of the underlying decking member. When so stacked, the projection 54 engages the interior of the sidewall 33 of the overlying decking member to provide increased lateral stability to the stack of decking members.

In other embodiments, such as illustrated in FIG. 38, the center 300 for the radius bend for the projection 302 may be outwardly displaced slightly from the centers 304, 306, for the radius bends of the crest and groove. In this way, the generally horizontal shoulder 308 may be enlarged for additional support of the cover plate without destroying the stacking stability thereof. Additional horizontal support for the stacking of the decking members may be provided by moving the center 306 slightly inward of the center 304.

A second embodiment of the decking member of the present invention is illustrated in FIG. 8. With reference to FIG. 8, it may be seen that the projection 54 of the embodiment of FIG. 7 may be omitted without losing the desirable mounting relationship of the cover plate 50 therewith by the lengthening of the upper leg of the groove 52. As shown in FIG. 8, the radius of curvature R-1 and R-2 are the same, with the radius of curvature R-3 being greater than R-1 by slightly more than the thickness of the lower leg 82 of the groove 52 with the lower portion of the sidewall will overlie the upper surface of the junction of the upper leg 81 of the groove with the crest 32 to provide lateral stability for the decking members when stacked for shipment and for storage at the job site.

As may also be seen from FIG. 7, the outer edge of the crest is outside the intersection 83 of the planes of the sidewall 33 and crest 32 and a vertical line 86 through the lateral edge of the crest will intersect the sidewall structure at or outside the plane of the sidewall 33.

A third embodiment of the decking member of the present invention is illustrated in FIG. 32. As shown therein, the decking member may comprise two crests 220 and a central valley 224 and the two halves 226 of a side-lap valley. As illustrated, the width of the central valley may be significantly increased over the width of the side-lap valley to provide the room needed for three services, even in a relatively narrow decking member. For example in a 24 inch wide decking member, the two crests 220 may be approximately 2.5 inches in width, the two halves 226 of side-lap valley approximately 2.0–2.5 inches each, and the central valley approximately 14 to 15 inches.

Each half of the side-lap valley provides adequate room for the welding of a bolt 228 or other projection as a shear connector thereto and to supporting beam 230. The concrete/steel interaction may thus be enhanced.

The increase in the width of the central valley requires the use of two stiffening ridges 232. These ridges 232 may approximate in height the grooves in the sidewalls of the decking member and thus tend to raise the neutral axis and thereby balance the decking member in compression and tension.

As shown in FIG. 36, the height of the ribs 260 may be increased to an elevation intermediate the height of the crests 262 and the grooves 264, e.g., about 2.6 inches for a three-inch deck.

These ridges 232 also support the cover plate 234 and provide dividers for the three services. Where the relationship between height of groove on ribs is held constant for decking members of different depth, the same cover plate may be used.

In addition, the top of the ridges provide a convenient location for attachment of preset inserts to the cover plate and to the decking member without risk of the fasteners protruding into the cells. Screws may be used in lieu of pop rivets and the necessity for the grounding of the cover plates to the decking member adjacent the grooves therein may be obviated.

As shown in the embodiment of FIG. 36, the ridges 260 may extend upwardly at an angle of approximately 80 degrees to a height adjacent the height of the crests 262, i.e., about ⅜ inch below the crests in a 3 inch deck and thus about mid-height of the grooves 264. This addition of steel at this elevation, together with any increase in the width of the crests, raises the neutral axis of a three inch decking section from about 1.0 inch above the valley 266 to about 1.3 inches. The increased structural properties permits the use of a lesser gauge steel and significant cost savings.

A further increase in the structural properties of the decking member results from an increase in the width of the crests 262 and a further reduction in the width of the side-lap valleys 274 to about three inches or about twenty-two percent of the width of the central valley 268 in a 24-inch decking member. This narrowing of the side-lap valleys 270 to about three inches for a two foot wide decking member results in a central valley/side-lap valley width ratio of about 9:1.

If total electrification is desired, consecutive 30" wide members may be used to produce an electrified valley on 30" centers. To achieve this width, the side-lap valley may be extended three inches on each side. This extension of the side-lap valleys also provides room for shear connectors.

The decking member of the present invention may be blended with non-electrified deck, using a two-foot decking member such as illustrated in FIG. 36 with one or two sections of non-electrified deck to provide an electrified valley on four, five or six-foot centers, etc.

Because of the increased section properties of the electrified deck, a lighter gauge metal may be used than is required for the conventional non-electrified decking.

The Cover Plates

Figure 4:
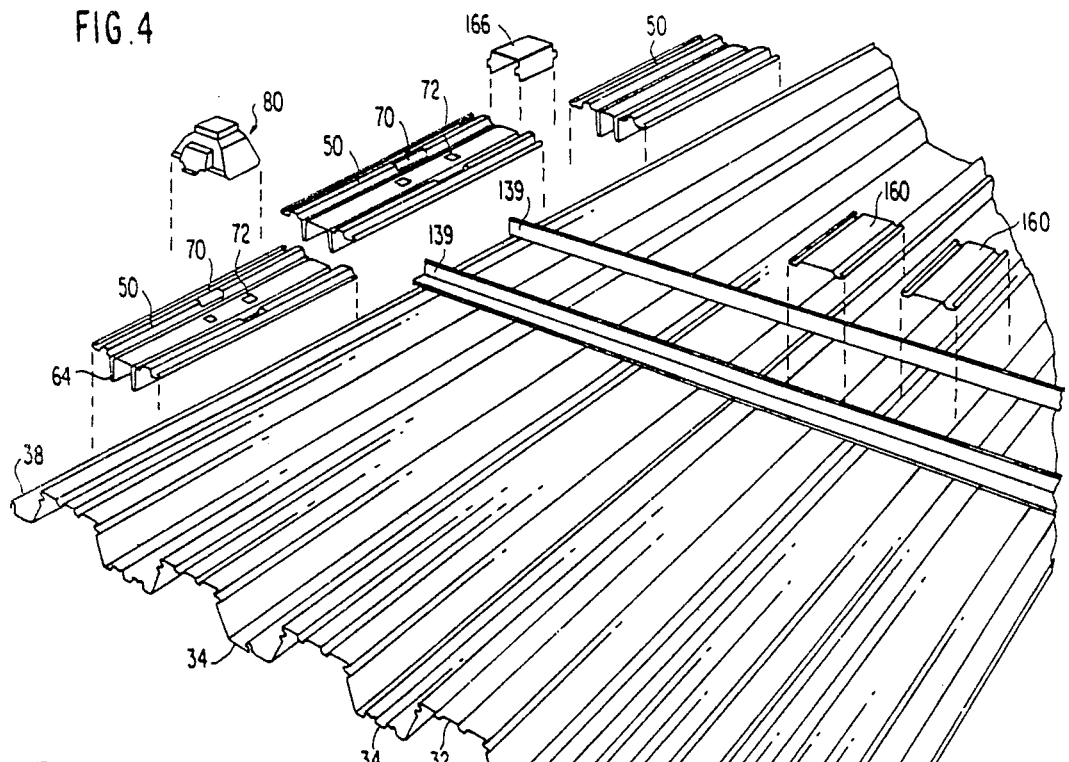
FIG. 4 is a pictorial view, partly exploded, illustrating the assembly of one embodiment of the electrical distribution system.

The cover plate 50 of FIG. 4 is illustrated in greater detail in FIGS. 5 and 6 and in a preferred embodiment includes three lateral sections, each of the two outer sections having a flat portion 56 at the same elevation as that of the crest 32 and an outer edge portion at a distance D-1 below the elevation of the crest 32. As illustrated in FIG. 5, the outer edge portion includes an edge upturned to present an outwardly convex projection 58 for entry into the groove 52 formed in the upper portion of the sidewall 33 of the decking member.

With continued reference to FIG. 5, the center section of the cover plate 50 includes a flat portion 60 interconnected with the flat portions 56 of the outer sections by the dual wall downwardly extending legs 62. The cover plate 50 is desirably one-piece construction with the dual wall leg 62 being open at the upper end and closed at the lower end 64 to mate with the groove 48 in the upper surface of the projection 46. The height D-2 of the projection 46 above the valley is desirably dimensioned not only to provide stiffening of the valley floor of the decking member, but to reduce the length of the leg 62 necessary to support the flat surfaces 56 of the cover plate substantially coplanar with the crest 32.

As may be seen in FIG. 5, the lateral distance between the convex projections 58 of the cover plate 50 is greater than the lateral distance between the adjacent crest 32. However, the legs 62 act as spring members permitting resilient lateral compression of the upper portions of the leg 62 sufficient for the lateral edges 58 of the cover plate 50 to enter the grooves 52 beneath the crest 32. As shown in FIG. 5, the dual wall leg 62 may be provided with a projection 66 or other means to enhance the leg 62 separating bias. It has been found, for example, that a separation D-3 of approximately one-third of the depth of the groove 52 is adequate. This distance D-1 and the angle A-1 between the two walls of the leg 62 is exaggerated in the illustration of FIG. 5 which approximates the spacing prior to installation. Once snapped into place, as shown in FIG. 5, this distance may be about one-half the distance illustrated.

In a typical embodiment, the distance D-3 is about ⅛ inch once the cover plate has been snapped into place.

The use of a radius of 1/16 inch or less at the lower end of the legs insures a V-shaped leg which increases the resistance to lateral compression and hence the snap-lock of the coverplate into the groove. The spacing between the walls of the legs is also reduced and provides adequate structural strength without the presence of concrete therebetween. The right radius at the lateral edge of the cover plate increases the amount of concrete in the groove with the cover plate in place increases edge rigidity, thus increasing the locking action.

As shown in FIG. 5, the laterally outward side of the dual wall legs 62 is joined to the flat portion 56 of the outer section by an upwardly and outwardly inclined portion 68. As shown in FIG. 6, each of the cover plates 50 may be provided with a first pair of laterally separated knock-outs 70 encompassing laterally the entire space of the inclined portion 68 and about seventy-five percent of the flat portion 56 of each outer section. The effect of the reduction in the height of the flat portion 60 of the inner section below that of the flat portion 56 of the outer section (D-1 less D-4) provides an effective angle of entry A-2 to the horizontal of about fifteen degrees. This effective downward and outward entry into the outer two of the three longitudinal cells of the electrified valley facilitates the handling of the electrical wiring contained therein. In addition, the reduction in height provides adequate space for a duplex receptacle to be mounted in a generally vertical position, thereby increasing the central working area of the preset insert.

The height differential between the center and side cells is generally ⅜ inch or more. In a nominally 3 inch deep deck, it may be approximately ¾ inch. This differential may of course be achieved by any differential in the relative height, i.e., the side cells may not rise to the level of the crests and the center cell may be either above or below the level at which the cover plate engages the sidewalls of the decking members.

Figure 6:
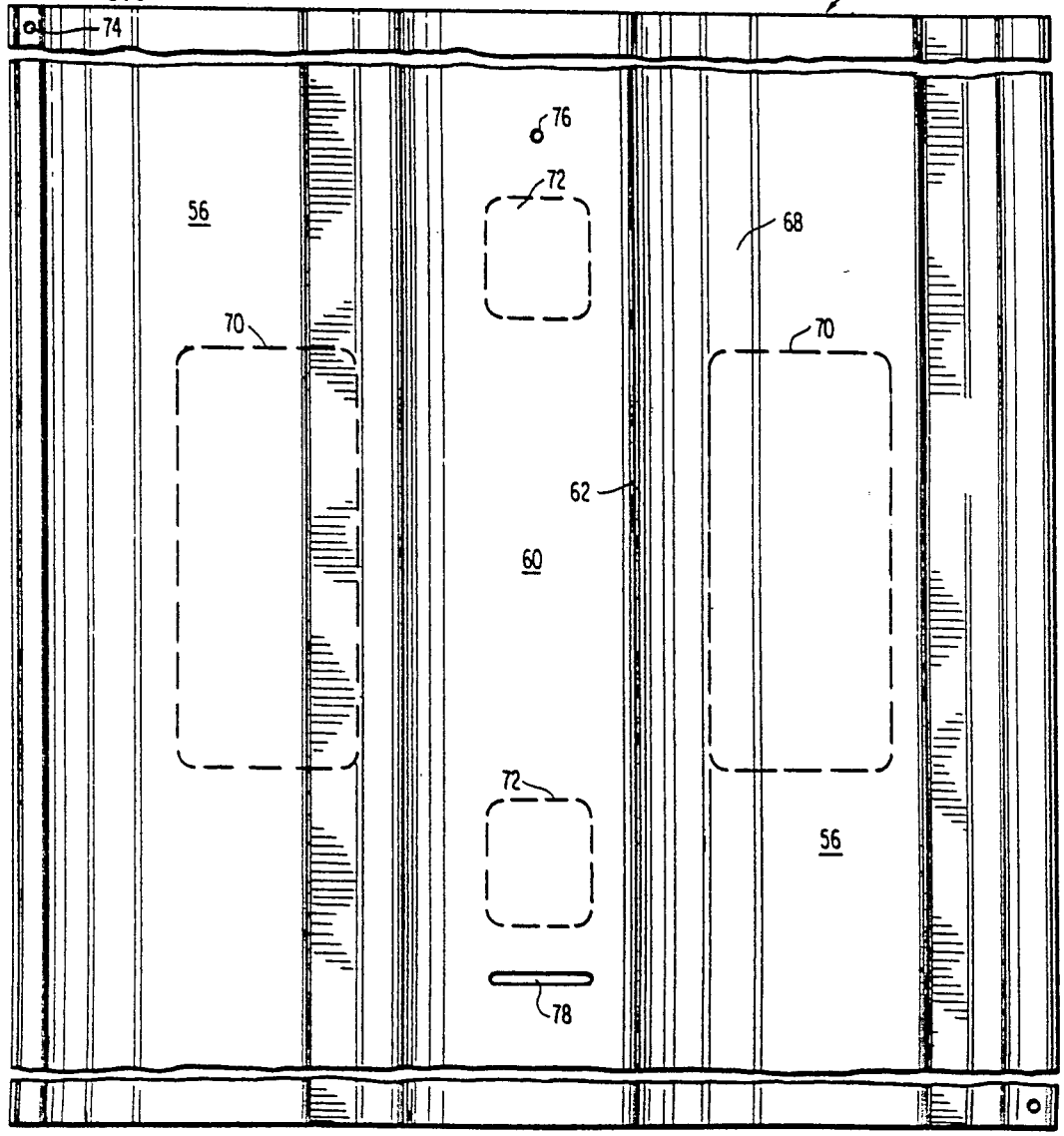
FIG. 6 is a top plan view of the cover plate of FIG. 5.

As shown in FIG. 6, each of the cover plates 50 may also be provided with a second pair of longitudinally spaced knockouts 72 to provide two entries into the flat portion 60 of the central cell of the electrified valley.

As shown in FIG. 6, each of the cover plates may be provided with one or more apertures 74 for the electrical grounding and mechanical attachment by a screw to the metal decking members as described hereinafter in greater detail in connection with FIGS. 7 and 8.

Figure 11:
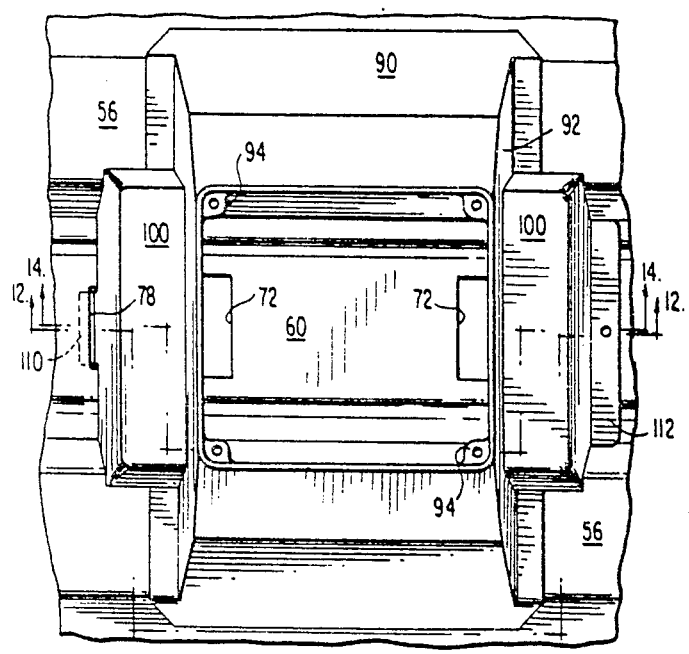
FIG. 11 is a top plan view of the preset insert of FIG. 9.

As also shown in FIG. 6, each of the cover plates may be provided with an aperture 76 and a laterally extending slot 78 located respectively laterally outside of the second pair of knock-outs 72. As is explained in greater detail in connection with the preset insert of FIGS. 11, 12, and 14, the aperture 76 and the slot 78 may be used to facilitate the rapid attachment of the preset insert 80 to the cover plate 50 as shown, for example, in FIG. 4.

As illustrated in FIG. 4, the cover plates 50 of the present invention are disposed in an end to end relationship overlying only the valleys intended to be electrified. These cover plates 50 may be of different lengths, desirably multiples of the preset insert spacing, e.g., ten to fifteen feet, and may include one grouping of knock-outs as illustrated in FIGS. 4 and 6, or more as a function of length and the need for access to the electrical wiring contained therein. Access to this electrical wiring is achieved through a plurality of preset inserts each mounted on the cover plate 50 in position to enclose one of the groupings of knock-outs.

A second embodiment of the cover plate of the present invention is shown in FIG. 30 where the cell area is divided into two rather than three cells. Where the decking section of FIGS. 1 and 5 is used in the valley area, the lower end 64 of the dual wall legs 62 may rest in the groove 48 in the stiffening bead 46. Lateral stability may also be enhanced by positioning the leg 62 at one side of the bead 46 as shown in dashed lines. In either event, a significant difference in the relative capacity may be achieved to accommodate the relatively small capacity requirement of the power service and the relatively large potential capacity requirement of communications cables.

A third cover plate embodiment is shown in FIG. 31 where three cells are provided in one valley, with access to the side cells facilitated by the height differential of the center section 63 and the side sections 65 as in the cover plate of FIG. 5.

This height differential is also useful in the cover plate 234 illustrated in FIGS. 32 and 34B. With reference to FIG. 32. The cover plate may be connected to the inclined side walls or web of the deck in the snap-lock fashion described earlier and may rise to the height of the crests 220 thereof for the side section 236. The reduced height center section 238 may be configured to mate with the tops of the ridges 232 so as to provide isolation of the three cells and enhanced stability.

A fourth cover plate embodiment is illustrated in FIG. 36. With reference again to FIG. 36, the cover plate 274 uses less steel in cooperating with the decking member to form the longitudinal cells, the three sections being separated by upwardly convex longitudinal grooves 275. It may be secured in the grooves 264 in the sidewalls 272 of the decking members in the manner earlier described and/or attached directly to the cell dividers 260 of the decking member by suitable metal fasteners 276 thus providing a secure mechanical mounting and electrical ground.

The height differential between the center and side cells is approximately 0.5 to 0.625 inches for a three inch deck and provides for an angled access to the lateral cells through knockouts 280. Access to the central cell may be provided through knockouts 282, the knockouts 280, 282 being removed at the time the present insert is activated.

A fifth cover plate embodiment is illustrated in FIGS. 39 and 40. With reference to the figures, the cover plate 310 conforms generally to the configuration illustrated in FIG. 36 and is provided with a pair of longitudinally spaced knock-outs 312 for the central power cell, and a pair of laterally spaced knock-outs 314 for the lateral cells. The knock-outs 312 may be generally semi-circular, preferably semi-elliptical as shown, and the knock-outs 314 may be generally rectangular, preferably with rounded corners as shown. In conformity with the footprint 316 of the preset insert hereinafter described in connection with FIG. 37, the cover plate may be provided with a slot 318 and a pair of apertures 320 by which the preset insert may be held securely in place.

One of the grommets 322 illustrated in dashed lines in FIG. 39 is illustrated in greater detail in FIGS. 41 and 42. With reference to FIGS. 41 and 42, the grommet 322 is generally c-shaped in cross-section and may be continuous. However, and as shown in FIGS. 39 and 40, the grommet 324 for the apertures to be side cells need not be continuous and may terminate at the junction of the outer surface 310 and the groove, as the curved surface of the ribs or cell dividers 260 of the decking member provide a smooth exit for the wires 326 illustrated in FIG. 40.

The Preset Insert

Figure 9:
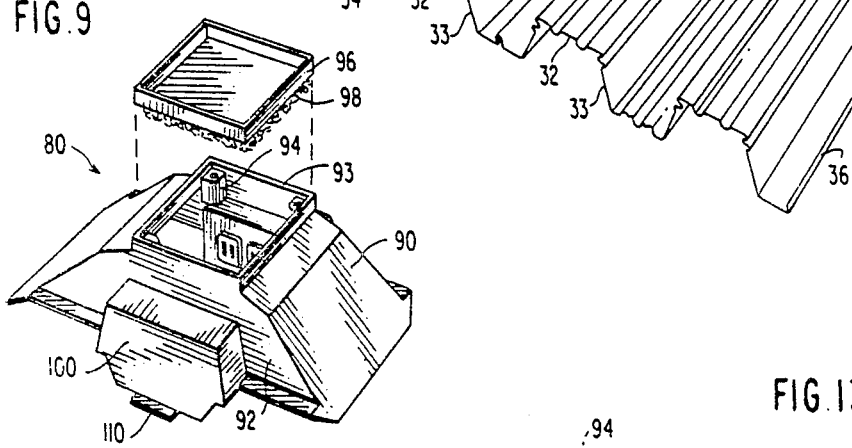
FIG. 9 is a pictorial view of one embodiment of the preset insert of the present invention.

The preset insert 80 of FIG. 4 is illustrated in greater detail in FIG. 9 an is shown mounted in the composite floor in FIG. 10. As shown in FIG. 10, each of the preset inserts 80 is carried by one of the cover plates 50, which is in turn supported by the sidewalls and floor of an interior valley of the decking members.

As also shown in FIG. 10, concrete poured on the floor when assembled will fill those valleys of the decking members not to be electrified and will be poured to a depth slightly above the top of the preset insert 80 to form a smooth planar floor. Access to the preset insert may be obtained by removal of the thin layer of concrete overlying the preset insert and access thus obtained through the first pair of knock-outs 70 of FIG. 6 into the outer two of the three longitudinal cells. Access through the preset insert may be obtained into the inner cell through the second pair of knock-outs 72 illustrated in FIG. 6.

As shown in FIG. 9 and in the more detailed view of FIGS. 11-14, the preset insert 80 may include upstanding sidewalls 90 and end walls 92 terminating in a rim 93 defining a generally rectangular opening. Retaining means 94 are desirably located in the corners of the opening and are carried by the end walls 92. These retaining means 94 desirably have a planar upper surface to support a removable top 96. While not necessary, it is desirable that the removable top 96 be provided with a layer of heat-resistant foam insulation to reduce the transfer of heat from floor to floor through unused preset inserts in the event of a fire. The insulation 98 may be seen more clearly in FIG. 14.

Figure 13:
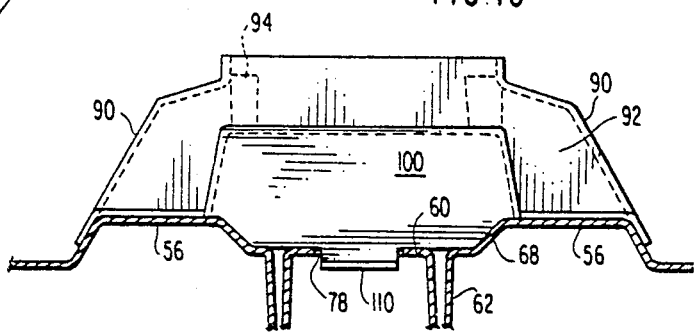
FIG. 13 is an end view in elevation of the preset insert of FIG. 9.

With continued reference to FIGS. 9, 10 and 13, the sidewalls 90 desirably overlie the sloped portion of the outer sections of the cover plates 50. As may be seen in FIGS. 9-11 and 14, the end walls desirably include a recess 100 for containing electrical terminations such as the duplex electrical power receptacle 102 illustrated in FIGS. 14 and 15. As shown in FIG. 14, each of the retaining means 94 which supports the top 96 may be notched on the underside to receive the upper edge of the mounting plate 104.

To install, the wire 106 from the inner cell may pass upward through one of the apertures left by removal of the knock-outs 72 in the cover plate illustrated in FIG. 6 for attachment to the electrical receptacle. The upper edge of the mounting plate may be positioned beneath the retaining means 94 and the receptacle rotated downwardly as shown by the arrow in FIG. 14 until the tab 108 on the lower edge of the mounting plate enters the aperture to lock the mounting plate into position.

The preset insert 80 of the present invention may be installed on the cover plate 50 by the insertion of the tab 110 into the slot 78 and by the use of a fastener through an aperture in the flange 112 and the aperture 76 in the flat portion 60 of the cover plate. Alternatively, the cover plate of FIG. 6 may replace the aperture 76 with a slot and the preset insert provided with two tabs.

The inclined walls of the inserts permit stacking during shipment with the upper surface of the rim 93 mating with the groove 95 behind the retaining means 94.

A second embodiment of the preset insert of the present invention is illustrated in FIGS. 16-19. With reference to FIGS. 16-19, the preset insert includes upright sidewalls 114 and end walls 116 and provide a generally rectangular top opening 118 through which access to the preset insert may be made. A removable top (not shown) may be provided which may also be insulated as heretofore described.

Figure 18:
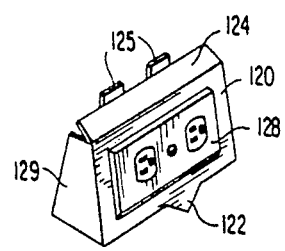
FIG. 18 is a pictorial representation of the electrical receptacle of FIG. 17.
Figure 19:
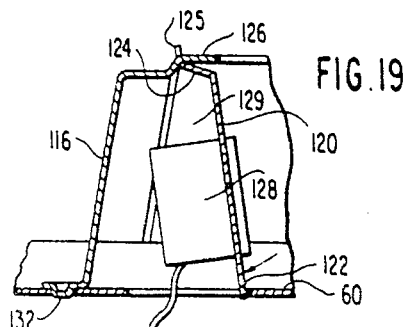
FIG. 19 is a partial section in elevation illustrating the mounting of the electrical receptacle of FIG. 18 in the preset insert of FIG. 16.

As shown in FIG. 18, the electrical terminations may comprise a mounting plate 120 having a pointed tab 122 at the lower edge and an angled flap 124 along the upper edge. The flap 124 may be provided with two tabs 125 for insertion into the slots 127 shown in FIG. 16. As shown in FIG. 19, the mounting plate may be mounted by insertion of the tabs 125 of the flap 124 through the slots 127 in the top edge 126 and downwardly rotating the mounting plate until the tab 122 penetrates the flat portion 60 of the cover plate 50. The electrical terminations carried by the mounting plate 120 may be in a suitable duplex or triplex electrical power receptacle 128, shielded by side plates 129 as shown in FIG. 18 but omitted in FIG. 19 for clarity of illustration.

Figure 16:
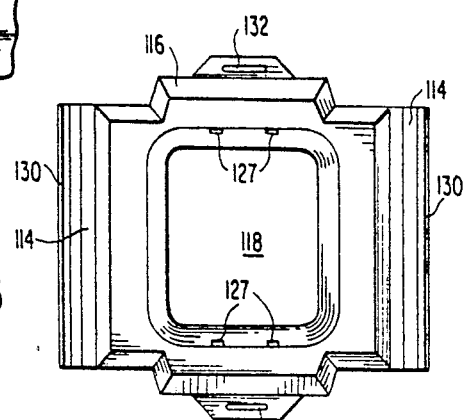
FIG. 16 is a top plan view of a second embodiment of the preset insert of the present invention.
Figure 17:
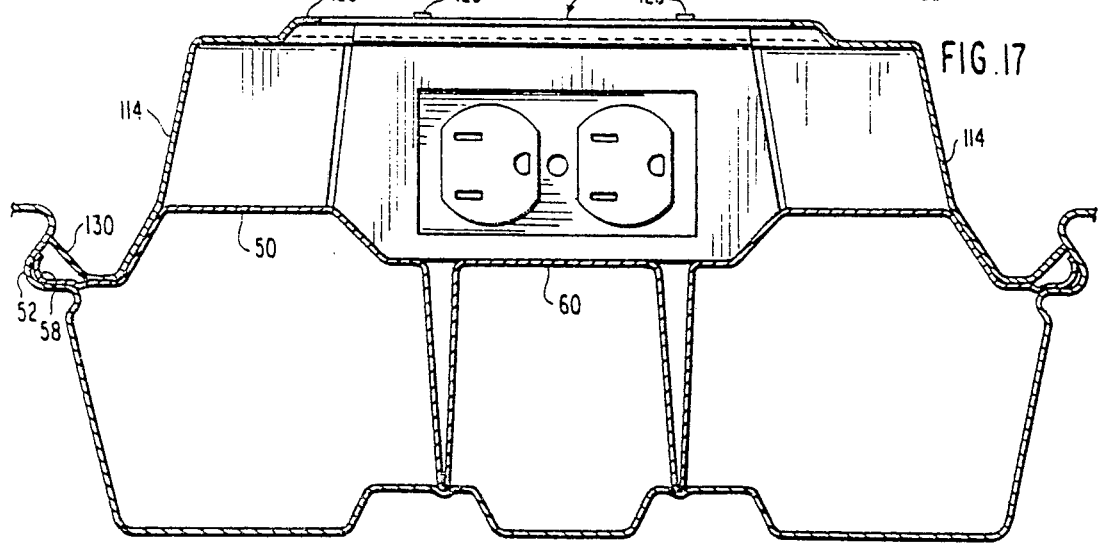
FIG. 17 is a section in elevation illustrating the mounting of the preset insert of FIG. 16 on an electrified valley.
Figure 17A:
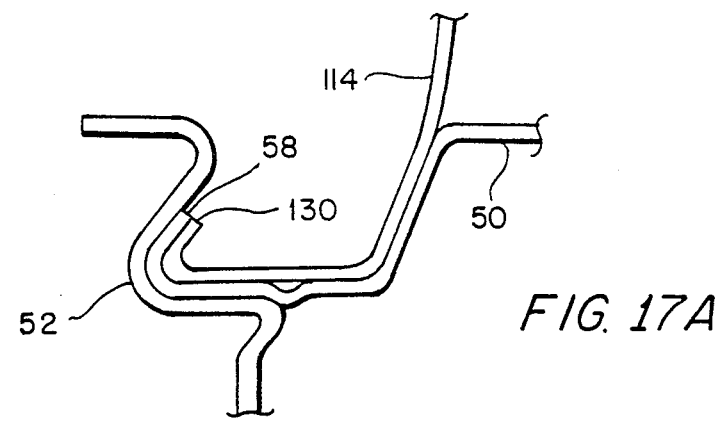
FIG. 17A is a section in elevation illustrating any alternative insert lateral edge configuration.

As shown by the respective figures, one of the significant differences between the embodiment of FIGS. 16-19 and the embodiment of FIGS. 11-15 is the lower termination of the sidewalls 114. As shown in FIG. 17, the sidewalls may overlie the slanted section of the outer sections of the cover plate 50 and thereafter turn upwardly at an angle of about 45 degrees to form a flange 130 to overlie the lateral edge 58 of the cover plate 50 within the groove 52 in the sidewall 33 of the decking member. This angle provides substantial hold-down force during the construction phase.

Another distinction is the mounting of the preset insert to the cover plate. In the embodiment wherein the aperture 76 of the flat portion 60 of FIG. 6 is replaced by a longitudinal slot such as the slot 78, the tab 110 and flange 112 of the embodiment of FIGS. 11-14 may be replaced by a spring lock fastener 132 as shown in FIGS. 16 and 19.

The inclined walls facilitate stacking during shipment and the one-piece construction permits construction out of sheet metal, allowing resilient snap-in mounting of the cover plates.

The Lateral Trench

As shown in FIG. 4, a lateral trench may be formed by two side rails 139, a plurality of trench bottom plates 160 and a top plate 156 (not shown).

With reference to FIG. 20 where one embodiment of the trench of the present invention is illustrated, the side rail 139 may comprise a first elongated metal member 140 having an inverted U-shaped channel with horizontally extending horizontal flanges 142 and 144. The flanges are adapted to overlie as shown in FIG. 4 and to be secured to the crest 32 of the decking members in a suitable conventional manner such as by threaded fasteners or pop rivets.

A second elongated metal member includes a horizontal central section 146 with an upwardly and then outwardly extending section 148 on the side of the rail away from the trench. On the trench side of the horizontal center section 146, the second metal member has a downwardly extending section 150 which overlies one of the arms of the U-shaped channel when the apertures in the bottom of the U-shaped channel of the first elongated member and the horizontal center section of the second elongated member are aligned. The separation between the first and second elongated members may be vertically adjusted by means of a flanged bolt 152 and a locking nut 154. The metal plate 156 which forms the top of the trench may thus be raised or lowered from above the height to which the concrete floor 153 is to be poured.

The projection 155 of the second member may provide a seat for a suitable spring-biased latching member 157 carried by the lower surface of the plate 156 to resiliently retain the position of the plate over the trench.

With continued reference to FIG. 20, the free ends of the cover plates may be capped by a closure 158 where the cover plates intersect the trench. This closure may be generally J-shaped in cross section as illustrated in FIG. 21, having an edge turned away from the trench to present a smooth rounded surface and to thereby avoid possible damage to the electrical wires passing to the cell from the trench. The closure 158 may be fastened to the first elongated member of the rail, by fasteners through pre-punched holes located so as to avoid penetration into an electrified cell, e.g., with the depression between the flat portion 56 of the cover plate 50 and the laterally outermost portion of the crest 32 of the decking member. Alternatively, or additionally, the pre-punched holes may be aligned with the gap between the legs of the cover plate 50, e.g., in the distance D-3 in FIG. 5.

A second embodiment of the trench is illustrated in FIG. 22 wherein the lower member of the rail of FIG. 20 is replaced by a member having an inverted U-shaped channel 170 with a laterally extending flange 172 on the side thereof away from the trench and an upwardly extending flange 174 on the trench side thereof. The extreme lower end of the U thus formed may be slit to provide sliding access of a J-shaped closure member 176 therebetween. This J-shaped member 176 is illustrated in FIG. 23, and may be held therein by friction and the resilient pressure of the leg of the inverted U-shaped member and the flange 174.

A third embodiment of the two-piece trench rail of FIGS. 20 and 22 is shown in FIG. 35 where the upper surface 202 of the lower rail 200 has a different curvature than the lower surface of the upper rail 208 and adjustment is made by means of a threaded bolt 206 in the upper rail 208 acting against the surface 202 of the lower rail 200.

The bottom plates 160 of FIG. 4 may conform to the configuration of the cover plates 50 at their ends to mate with the grooves on the sidewalls of the decking members. Alternatively, they may comprise downwardly slanted edges 164 as shown in FIGS. 24 and 25 for supporting the surface 160 coplanar with the crest 32 by insertion into the grooves 52 of the decking members as they pass beneath the trench.

While not shown in FIG. 24, the surface 160 may include spaced longitudinal grooves in the areas of the valleys to provide additional stiffening.

The lateral edges of the bottom plates 160 may be provided with flanges 162 to overlie the flange 144 of the side rails as shown in FIG. 26. In this way, the lateral sides of the bottom plates may be secured to and supported by the side rails.

Figure 27:
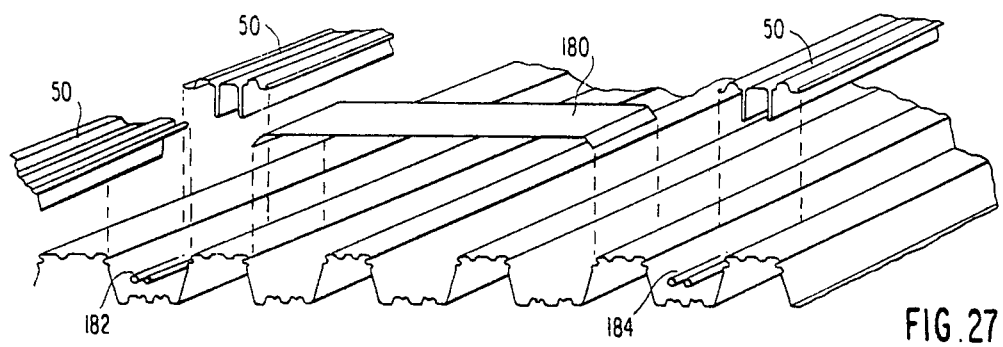
FIG. 27 is a pictorial view of a third embodiment of the trench bottom plates of FIG. 4.

As shown in FIG. 27, the bottom plate 160 of FIG. 4 may be replaced by a single layer bottom plate 180 configured like the bottom plate of FIG. 24 but spanning more than a single valley in the area between the side rails of the trench and between electrified valleys 182 and 184.

The bottom plates serve to keep concrete poured into the non-electrified valleys, i.e., those valleys not covered by a cover plate 50, from rising above the level of the decking into the trench. The use of bottom plates permits the entry of concrete beneath the trench in all non-electrified valleys and thus enhances the structural integrity of the composite floor.

Figure 28:
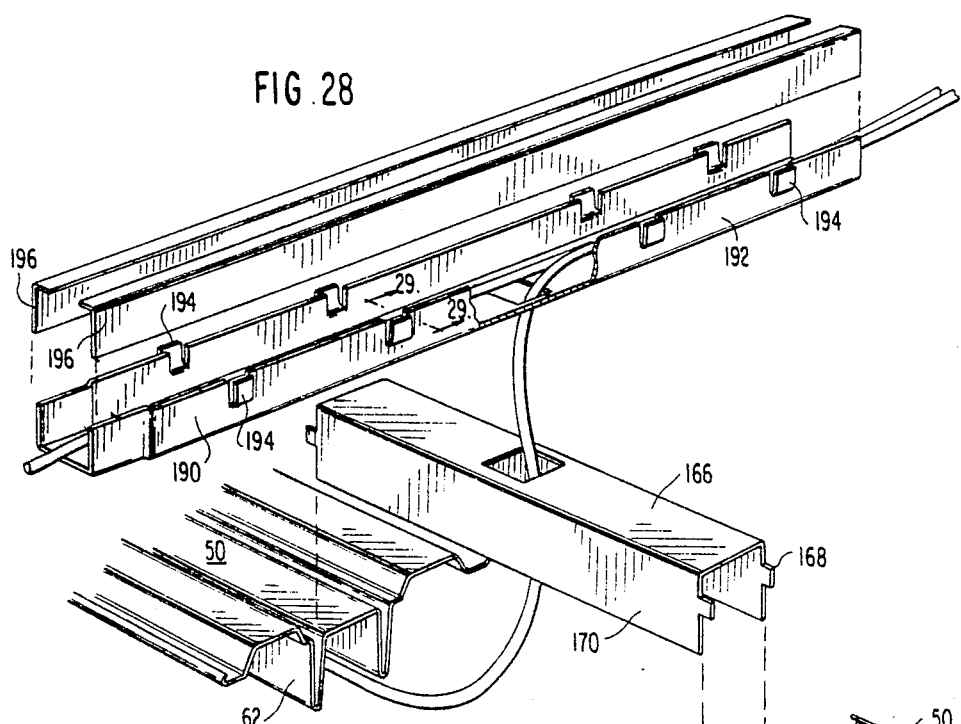
FIG. 28 is an exploded pictorial view showing the central cell partition for the trench and for an electrified valley in the area beneath the trench.

It may be desirable for the central longitudinal cell of an electrified valley to pass beneath the trench and to have access to the electrical services in the outer longitudinal cells. If desired, a partition such as illustrated in FIG. 28 may be utilized. With reference to FIG. 28, the partition 166 may be made of sheet metal in an inverted U-shaped cross-section with longitudinally extending tabs 168 extending from the longitudinal extremities of the legs 170. These tabs 168 may be placed between the dual wall legs 62 of the cover plate 50 to provide lateral stability as also shown in FIGS. 4, 20 and 22. In addition, the bottom edges of the legs 170 of the partition 166 may rest in the grooves 48 in the valleys of the decking members illustrated in FIG. 5 to prevent lateral movement.

It is generally necessary to separate the electrical power service from the telephone and other services within the trench. A separate power compartment may be formed as shown in FIG. 28 by a three-piece power cell designed to overlie the crests of the decking members parallel to but spaced from the side rails of the trench illustrated in FIG. 4.

Figure 29:
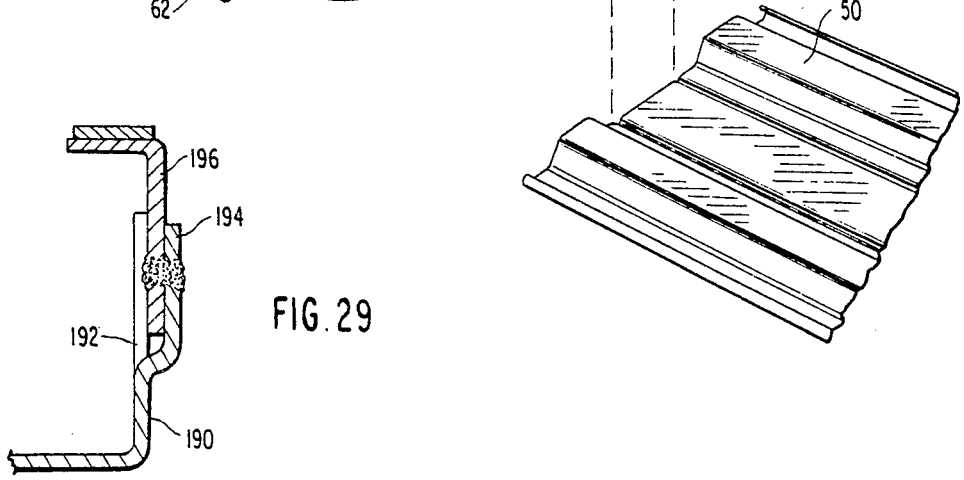
FIG. 29 is a section taken through lines 29-29 of FIG. 28.

With continued reference to FIG. 28, the power compartment may include a plurality of U-shaped members 190 each crimped on one end in the manufacturing process to facilitate the end-to-end joining thereof. The upstanding side walls 192 of the member 190 may be provided with a plurality of spaced fingers 194 adapted to frictionally receive side wall extensions 196 with inwardly or outwardly extending horizontal flanges. Once in place and adjusted to the desired height, the side wall extension 196 may be spot welded or otherwise secured to the walls and/or fingers as shown in FIG. 29 to permanently fix the height thereof.

As shown in FIG. 28, the electrical power service may be brought laterally across the composite floor within the power compartment of the trench, exit downwardly through a suitable aperture into the partition 166 and trench into the central cell of an electrified valley. The aperture in the bottom of the member 190 is desirably provided with rounded corners with the entire periphery flared downwardly in the direction of passage of the electrical power service to eliminate the necessary to grommet the aperture.

As suggested in FIG. 4, the service may then travel longitudinally along an electrified valley to the receptacle of one of the preset inserts spaced along the electrified valley just beneath the concrete floor.

Insert Pattern

Where the decking member of FIG. 32 is used, the central cell partition 166 of FIGS. 4 and 28 may take the form illustrated in FIGS. 33 and 34A.

With reference to FIG. 33, the edges 214 of the trench bottom plates 210 of FIGS. 34A and 44 overlie the crests 220 of the decking member with the partition 240 supported by the engagement of the legs 242 thereof on the ridges 232 of FIGS. 32 and 34.

The pattern of preset inserts generally desired is one of offset rows and it is thus useful to position the inserts relative to the trench header. This may be accomplished in the present invention by the alternative use of short sections of cover plate of different lengths.

As illustrated in FIG. 46, the trench bottom plates 342 are positioned over beam opening lengths of deck 340 in the location of the trench. Trench rails 344 may then be positioned transverse of the decking members 340, and covered by the trench cover 346.

For a total electrification system, by alternating a short section, e.g., one foot of cover plate 348 with a short section, e.g., 2.25 feet, and by locating the preset insert at the far end of the longer section, standard lengths, e.g., 15 feet, of cover plate 350 may be used to establish the desired pattern.

As shown in FIG. 47, where electrified deck 352 is blended with non-electrified deck 354, short sections without a preset insert (e.g., two feet) are alternated with short sections (e.g., 4.5 feet) with an insert adjacent one end to establish the pattern of offset rows.

Adaptation For Bar Joist Construction

The present invention is readily adapted for electrification of form decks, i.e., decks generally supported by bar joists in which the concrete slab is the primary structural element and the principal function of the metal deck is to provide a form over which the concrete slab is poured.

As shown in FIG. 48, the decking member 360 suspended between a selected pair of bar joists 362 may take the form of the decking member illustrated in FIG. 36, modified to eliminate the laterally outer portion of both crests 262 and the side lap valley 270. As illustrated in FIG. 48, the cover plate 364 may take the form of that illustrated in FIG. 36 and the preset insert 366 may be that illustrated in FIG. 37.

In a preferred embodiment, the header may take the form of a trench with side rails 368 and a trench cover plate 370. A longitudinal power channel may be provided as earlier described. Since the depth of the trench is the full depth of the slab 380, and may be of any desired width, the trench has adequate capacity.

The capacity of the distribution ducts formed by the decking member 360 and cover plate 364 is also adequate for three services inasmuch as the depth thereof is not limited by the depth of the concrete slab 380 and may extend downwardly to the full depth of the bar joist if desired.

The location of the preset insert 366 directly on the cover plate 364 rather than the form deck 382 permits the insert to occupy the entire depth of the slab and thus greatly increases the capacity thereof. This relationship allows the use of a submerged floor fitting in a relatively thin slab and is illustrated in FIG. 49. As shown in FIG. 49 the form deck 382 need not overlie the area of the cover plates 364 as shown in FIG. 48 because the cover plates serve as the form to support the concrete. If the form deck overlies the cover plates, it must be apertured for the preset insert.

ADVANTAGES AND SCOPE OF THE INVENTION

The many advantages of the present invention should be readily apparent to one skilled in the art to which this invention pertains. By way of example, the novel decking profiles provide increased strength and stacking stability over known prior art profiles. The groove construction facilitates concrete holddown, the snap-in of cover plates, the snap-in of present inserts, and the snap-in of bottom plates for the lateral trench. The elimination of apertures in the decking members permits the economical use of reduced strength reducing gauge steel.

The cover plates are self-supporting intermediate adjacent crests and provide for unequal power and communication cells, as well as for three services, all in a single valley. By the use of a configuration with narrow legs, there is no significant reduction in cell capacity. The cell capacity is also increased by raising the height of the cover plate in selected areas intermediate the crests. The one-piece construction provides ease of manufacture and the resiliency necessary for proper snap-lock retention.

The novel decking profiles provide adequate metal/concrete interaction, even with cover plates and preset inserts retained therein. Studs may be provided in the side-lap valleys.

In combination with the profile of the cover plates, sufficient space is provided for three services, with cell division provided by the resilient double walled legs and/or ridges in the decking member, particularly where the width of the central valley is greater than that of the side-lap valleys.

Access to the cells beneath the cover plates is easily obtained through snap-in preset inserts with snap-in electrical receptacles. In some embodiments, the preset inserts are simultaneosly attached to the cover plate and decking member by threaded fasteners to provide both a secure mechanical mounting and electrical grounding.

The use of trench rails of sheet metal significantly reduces the expense of the trench system, and the use of trench bottom plates eliminates the need to interrupt the concrete in non-electrified valleys by vertical concrete stops, thereby improving the strength of the composite floor. The trench bottom plates may also serve to locate the trench side rails and the power cell.

The unique cooperation of the various elements of the system of the present invention significantly reduces labor costs. Moreover, many of the components are nestable and thus reduce the space required for shipment and the space required for on-site storage. In addition, the possibility of damage during shipment is significantly reduced.

The various elements of the present system are easily adapted for bar joist construction and provide significantly increased capacity for a thinner slab.

These and many more advantages will be readily apparent to one skilled in the relevant art. The invention is defined in the appended claims, the scope of which is therefore to include, without limitation, the exemplary embodiments disclosed in the foregoing specification when given a wide range of equivalents.

What is claimed:

1. A metal floor comprising:
   a plurality of decking members, each having a plurality of alternating substantially coplanar crests and substantially coplanar valleys joined by slanting sidewalls,
   the upper portion of each of said sidewalls having a groove adjacent the junction with the adjacent one of said crests;
   a plurality of snap-in cover plates each having a knock-out in an upper surface and outwardly convex lateral edges adapted to engage one of the grooves in said sidewalls to support said cover plate over a valley to thereby form a longitudinally cell; and
   a preset insert including a housing having upright side walls and end walls, the lower portion of said end walls being adapted to overlie said cover plate in conformity therewith on opposite ends of said knock-out, the lower portion of said side walls terminating in an outwardly convex lateral edge adapted to be received in the groove in said sidewalls in an overlying relation to the lateral edges of one of said cover plates when engaged therein, said groove and the lateral edges of said cover plates and said preset inserts being configured to permit the ingress of concrete into said groove beneath said crests with the lateral edges of both said cover plate and said preset insert in place therein.

2. A plural cell electrified metal floor comprising:
(a) a plurality of one-piece metal decking members each having at least two coplanar crests and at least one interior valley connected on opposite sides by slanting sidewalls to the adjacent crests,
the upper portion of each of said sidewalls having a groove adjacent the junction of the sidewall with the adjacent one of said crests,
said valley having laterally spaced longitudinal support means for engaging the lower ends of legs;
(b) a plurality of one-piece snap-in cover plates each having three laterally spaced, flat upper surfaces and outwardly convex and upturned lateral edges, the interior one of said surfaces being at an elevation less than the lateral ones of said surfaces, each of said cover plates being dimensioned to overlie a valley of one of said decking members with said lateral edges engaging a groove in one of said sidewalls with said interior surface engaging said support means to thereby support said cover plates and longitudinally partition into three longitudinal electrical cells the area bounded by said cover plate, said valley underlying said cover plate and the immediately adjacent sidewalls,
each of said cover plates being sufficiently resiliently compressible in a lateral direction to permit entry of said lateral edges between said crests into said grooves,
each of said cover plates including an upper surface having a plurality of knock-outs therein; and
(c) including a plurality of preset inserts, each comprising a housing having upright sidewalls and endwalls, the lower portion of said endwalls being adapted to overlie one of said cover plates in conformity therewith on opposite longitudinal ends of said plurality of knock-outs, the lower portion of said side walls terminating in an outwardly convex lateral edge adapted to be received in the grooves in said side walls in an overlying relation to the lateral edges of one of said cover plates when engaged therein,
said grooves and the lateral edges of said cover plates and preset inserts being configured to permit the ingress of concrete into said grooves beneath said crests with the lateral edges of one of said cover plates and said preset inserts in place therein.

3. The floor of claim 2 wherein each of said decking members comprises in sequence a first one-half side-lap valley;
a first flute comprising one of said crests and sloping sidewalls;
said interior valley;
a second flute comprising a second one of said crests and sloping sidewalls; and
a second one-half side-lap valley, said support means of said interior valley including two spaced ridges upwardly projecting to a height more than one-half the height of said crests and less than the height of said crests.

4. The floor of claim 2 wherein the differences in the height of the flat portion of said interior section of said cover plates and the flat portion of said lateral sections thereof is not less than about ⅜ inch.

5. The floor of claim 2 wherein the lateral sections of said cover plates are substantially coplanar with said crests and said interior section thereof is approximately the height of the connection thereof to the sidewalls of the decking member.

6. The metal floor of claim 2 wherein each of said plurality of decking members comprises two coplanar crests, an essentially imperforate interior valley connected to said crests by slanted sidewalls, and one-half of a side-lap valley on the outside of said crests connected thereto by slanted sidewalls, wherein the ratio of the width of said interior valley to the width of said side-lap valley of said plurality of decking members is not less than about 8.5:6.5.

7. The floor of claim 6 wherein the ratio of the width of said interior valley to the width of said side-lap valley of said plurality of decking members is about 3.5:1.

8. The floor of claim 7 wherein the support means of said interior valley of said decking member has at least one ridge upwardly projecting to a height less than the crests.

9. The floor of claim 7 wherein the support means of said interior valley of said decking member has two upwardly projecting ridges.

10. The floor of claim 9 wherein the sidewalls of said ridges are inclined to facilitate stacking.

11. The metal floor of claim 2 wherein each of said decking members comprise in sequence:
first one-half side-lap valley;
a first flute comprising one of said crests and sloping sidewalls;
said interior valley;
a second flute comprising a second one of said crests and sloping sidewalls; and
a second one-half side-lap valley, said support means of interior valley including two laterally spaced, longitudinally extended ridges upwardly projecting to a height more than one-half the height of said crest and less than the height of said crest.

12. The floor of claim 11 wherein the sidewalls of said flutes include a groove adjacent said crests, and
wherein the height of said ridges is at least as great as the height of said grooves.

13. The floor of claim 12 wherein the sidewalls of said ridges are inclined so as to facilitate nesting of said decking members.

14. The floor of claim 13 wherein the ratio of the width of said interior valley to the width of said side-lap valley is about 3.5:1.

15. The floor of claim 11 wherein the ratio of the width of said interior valley to the width of said side-lap valley is about 3.5:1.

16. In an electrified metal floor including decking members with alternating crests and valleys, at least one of the valleys being longitudinally partitioned to provide three parallel electrical cells;
a lateral trench overlying said decking members;
a metal cap extending the central one of said three cells through said partitioned valley underlying said trench, said cap comprising integral sides, top and lateral flanges, each of said flanges being adapted to engage the partitions in said partitioned valley of said decking members adjacent said trench; and a plurality of bottom plates each comprising a flat portion dimensioned to span the width of the trench and the longitudinal distance between the opposite sides of adjacent of said crests, said flat portion being supported by said crests and having longitudinal edges inclined downwardly to engage said opposite sides.

17. The floor of claim 16 including means for stopping the flow of concrete between the upper surface of the cover plates and the bottom of the trench rails.

18. A side rail for the lateral trench of an electrical distribution system in a composite metal/concrete floor comprising:

a lower member having in cross-section a generally outwardly extending lower flange adapted to be secured to the crests of corrugated metal decking members and having a curved upper flange;

an upper member having in cross-section a generally horizontal outwardly extending surface disposed in an overlying relationship to the curved upper flange of said lower member; and threaded means for adjusting the lateral separation between said lower and upper members.

19. The side rail of claim 18 wherein the surface of said upper members if upwardly convex.

20. In a trench having parallel side rails crossing the alternating crests and valleys of a metal decking and a removable cover plate carried by said rails, a plurality of bottom plates each comprising a flat portion dimensioned to span the width of the trench and the longitudinal distance between the opposite sides of adjacent of the crests to thereby provide a bottom for the trench over a span which includes two adjacent crests and the included valley, said flat portion being supported by said crests and having downwardly inclined longitudinal edges adapted (to engage the opposite side of the adjacent crests.)

21. The trench of claim 20 wherein said longitudinal edges are configured (to engage a groove in the sidewalls of the metal decking.)

22. The trench of claim 20 wherein said flat portion includes a pair of spaced beads for increasing the rigidity thereof and for centering a generally U-shaped power channel when positioned thereon.

23. The trench of claim 20 wherein said flat portion is dimensioned to underlie a portion of said side rails and terminates in upturned lateral edges.

24. In an electrified metal floor including decking members with alternating crests and valleys, at least one of the valleys being partitioned by two upstanding parallel ridges, and a lateral trench overlying the decking members, the improvement comprising a metal cap extending the central one of said three cells through said partitioned valley underlying the trench, said cap comprising integral sides, top and longitudinal flanges, each of said flanges being at an elevation lower than said top and being adapted to engage the ridges of said decking member in said partitioned valley along the entire length thereof in the area beneath said trench.

25. A method of installing an electrified steel/concrete floor comprising the steps of:

(a) installing corrugated steel decking having grooves in the sidewalls adjacent the crests;

(b) installing trench bottom plates and cover plates to the decking by snapping opposite edges thereof in the sidewall grooves to thereby define electrified valleys and the area of the trench;

(c) installing trench sidewalls; and (d) pouring concrete over the decking and cover plates except in the area between the trench rails.

26. A method of installing an electrified steel/concrete floor comprising the steps of:

(a) installing steel decking with plural crests and valleys;

(b) installing trench bottom plates over selected ones of the plural valleys, said plates having power channel positioning means;

(c) installing trench power channel across the trench bottom plates and intervening crests of the decking;

(d) installing trench side rails;

(e) installing cover plates to the decking over valleys other than said selected ones to thereby define electrified valleys; and (f) pouring concrete over the cover plates and the decking except in the area between the trench rails.

27. A method of installing an electrified steel/concrete floor comprising the steps of:

(a) installing steel decking with plural crests and valleys;

(b) installing trench bottom plates having power channel positioning means over selected ones of the valleys to thereby define the area of the trench;

(c) installing cell power channel in the area of the trench in valleys other than the selected valleys;

(d) installing trench power channel across the trench bottom plates and intervening crests of the decking;

(e) installing cover plates starter plates;

(f) installing trench side rails;

(g) installing the remaining cover plates to the decking to thereby define electrified valleys; and (h) pouring concrete over the cover plates and the decking except in the area between the trench rails.

28. The method of claim 27 including the step of installing a preset insert at spaced intervals along the length of the cover plates prior to the concrete pour.

29. A plural cell electrified metal floor comprising:

a plurality of one-piece metal decking members each having at least two coplanar crests and at least one valley connected on opposite sides by slanting sidewalls to the adjacent crests, the upper portion of each of said sidewalls having a reentrant groove adjacent the junction of the sidewall with the adjacent one of said crests, said valley having laterally spaced longitudinal support means for engaging the lower ends of legs; and a plurality of one-piece snap-in cover plates each having three laterally spaced, flat upper surfaces connected by depending legs and outwardly convex and upturned lateral edges, the interior one of said surfaces being at an elevation less than the lateral ones of said surfaces, each of said cover plates being dimensioned to overlie a valley of one of said decking members with said lateral edges engaging a groove in one of said sidewalls with said legs engaging said support means to thereby support said cover plate and longitudinally partition into three longitudinal electrical cells the area bounded by said cover plate, said valley underlying said cover plate and the immediately adjacent sidewalls, each of said cover plates being sufficiently resiliently compressible in a lateral direction to permit entry of said lateral edges between said crests into said grooves;

a plurality of preset inserts carried by said cover plates at intervals along the length thereof; and means for securing each of said preset inserts to one of said decking members through one of said cover plates.

30. The floor of claim 29 wherein said securing means include screws passing through the interior surface of said cover plates into the support means of said decking members.

31. The floor of claim 29 wherein said cover plates include two laterally spaced apertures generally semicircular in shape with a curved outer edge extending into said outer surface and a generally planar inner edge extending into the adjacent one of said grooves; and including a grommet covering the portion of said apertures outward of said groove.

32. The floor of claim 29 wherein said cover plates include longitudinally spaced apertures generally rectangular in shape with confronting necks; and including a grommet covering the edge of said apertures exclusive of said necks.

* * * * *